United States Patent
Park et al.

(10) Patent No.: US 11,570,805 B2
(45) Date of Patent: Jan. 31, 2023

(54) ROBUSTNESS ENHANCEMENT FOR DOWNLINK CONTROL INFORMATION IN A DOWNLINK DATA CHANNEL

(71) Applicant: QUALCOMM Incorporated, San Diego, CA (US)

(72) Inventors: Sungwoo Park, San Diego, CA (US); Jing Sun, San Diego, CA (US); Tao Luo, San Diego, CA (US); Xiaoxia Zhang, San Diego, CA (US); Zhifei Fan, San Diego, CA (US); Wooseok Nam, San Diego, CA (US); Akula Reddy, San Diego, CA (US); Ahmed Abdelaziz Ibrahim Abdelaziz Zewail, San Diego, CA (US); Srinivas Yerramalli, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 17/075,430

(22) Filed: Oct. 20, 2020

(65) Prior Publication Data
US 2021/0120579 A1    Apr. 22, 2021

Related U.S. Application Data

(60) Provisional application No. 62/924,596, filed on Oct. 22, 2019.

(51) Int. Cl.
*H04W 72/14* (2009.01)
*H04W 24/08* (2009.01)
(Continued)

(52) U.S. Cl.
CPC ........... *H04W 72/14* (2013.01); *H04W 24/08* (2013.01); *H04W 72/042* (2013.01); *H04W 72/0446* (2013.01)

(58) Field of Classification Search
None
See application file for complete search history.

(56) References Cited

U.S. PATENT DOCUMENTS 9,191,941 B2 * 11/2015 Kim .................... H04W 72/042
2011/0044239 A1    2/2011 Cai et al.
(Continued)

OTHER PUBLICATIONS

International Search Report and Written Opinion—PCT/US2020/056715—ISA/EPO—dated Feb. 24, 2021.

*Primary Examiner* — Faruk Hamza
*Assistant Examiner* — Cassandra L Decker
(74) *Attorney, Agent, or Firm* — Holland & Hart LLP

(57) ABSTRACT

Methods, systems, and devices for wireless communications are described. A user equipment (UE) may receive, in a control channel, a first grant identifying a first set of resources of a first data channel on which the UE is to monitor for one or more second grants, the first data channel being downlink. The UE may monitor the first set of resources in the first data channel for the one or more second grants, the one or more second grants identifying a second set of resources of a second data channel on which the UE is to perform data communications. The UE may transmit, based at least in part on the monitoring the first set of resources, a feedback message associated with receipt of the one or more second grants.

30 Claims, 17 Drawing Sheets

(51) Int. Cl.
  *H04W 72/04* (2009.01)
  *H04L 5/00* (2006.01)

(56) References Cited

U.S. PATENT DOCUMENTS

| | | | |
|---|---|---|---|
| 2014/0050130 A1* | 2/2014 | Kim | H04L 5/0053 370/280 |
| 2014/0105158 A1* | 4/2014 | Kim | H04L 1/001 370/329 |
| 2015/0124754 A1* | 5/2015 | Forster | H04W 72/0406 370/329 |
| 2017/0171850 A1* | 6/2017 | Ang | H04L 5/1469 |
| 2018/0077688 A1* | 3/2018 | Yi | H04W 16/14 |
| 2018/0198572 A1* | 7/2018 | Wang | H04W 28/0278 |
| 2019/0053081 A1* | 2/2019 | Bagheri | H04W 72/042 |
| 2019/0123879 A1 | 4/2019 | Wang et al. | |
| 2019/0181988 A1* | 6/2019 | Gao | H04W 72/0413 |
| 2019/0239242 A1* | 8/2019 | Yi | H04W 72/1268 |
| 2019/0261330 A1* | 8/2019 | Hwang | H04L 5/00 |
| 2019/0386789 A1* | 12/2019 | Fröberg Olsson | H04L 5/0053 |
| 2020/0220691 A1* | 7/2020 | Gao | H04L 5/001 |
| 2020/0235866 A1* | 7/2020 | Liu | H04L 1/1812 |
| 2022/0123906 A1* | 4/2022 | Wu | H04L 1/1812 |

* cited by examiner

ROBUSTNESS ENHANCEMENT FOR DOWNLINK CONTROL INFORMATION IN A DOWNLINK DATA CHANNEL

CROSS REFERENCE

The present Application for Patent claims the benefit of U.S. Provisional Patent Application No. 62/924,596 by PARK et al., entitled "ROBUSTNESS ENHANCEMENT FOR DOWNLINK CONTROL INFORMATION IN A DOWNLINK DATA CHANNEL," filed Oct. 22, 2019, assigned to the assignee hereof, and expressly incorporated by reference herein.

BACKGROUND

The following relates generally to wireless communications, and more specifically to robustness enhancement for downlink control information in a downlink data channel.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support robustness enhancement for downlink control information in a downlink data channel. Generally, the described techniques provide for various techniques that improve performance of a grant conveyed in a first data channel, such as a physical downlink shared channel (PDSCH). For example, a base station may transmit or otherwise convey a first grant (e.g., a downlink control information (DCI) grant) in a control channel (e.g., a physical downlink control channel (PDCCH)) to a user equipment (UE). The first grant may carry or otherwise convey an indication of a corresponding first set of resources of a first data channel (e.g., a first PDSCH) that the UE is to monitor for receiving additional grants. The UE may monitor the first set of resources (e.g., as identified in the $DCI_{CORESET}$, where CORESET refers to the control resources set configured for the UE) to receive one or more second grants (e.g., $DCI_{PDSCH/PUSCH(s)}$). Generally, the second grants may carry or otherwise convey information identifying a second set of resources of a second data channel (e.g., second PDSCH resources) on which the UE is to perform data communications. The UE may transmit or otherwise provide an indication of a feedback message associated with receipt of the one or more second grants based on the monitoring of the first set of resources. That is, the UE may provide acknowledgment/negative-acknowledgment (ACK/NACK) information in the feedback message to the base station indicating whether or not the one or more second grants were received. In some examples, the resources allocated by the second grant(s) may be provisionally allocated resources depending upon whether or not the UE acknowledges receipt (e.g., ACK in the feedback message) of the second grant(s). For example, if the feedback message indicates that the UE received the second grant(s), the base station may perform the data communications over the second set of resources. If the feedback message indicates that the UE did not receive the second grant(s) (or if a feedback message was not received at all by the base station), the base station may reallocate the second set of resources (e.g., to the same UE, to a different UE, etc.) to avoid waste. For example, the base station can reallocate the second set of resources to the same UE as well as a different UE. That is, after canceling a PDSCH allocation indicated by a NACKed DCI, the base station may attempt to allocate the resource to the same UE again by retransmitting the DCI. Accordingly, aspects of the described techniques provide a mechanism that improves the performance of the $DCI_{PDSCH}$ grant(s) (e.g., the second grant(s)) received in the first data channel, e.g., the downlink data channel.

A method of wireless communication at a UE is described. The method may include receiving, in a control channel, a first grant identifying a first set of resources of a first data channel on which the UE is to monitor for one or more second grants, the first data channel being downlink, monitoring the first set of resources in the first data channel for the one or more second grants, the one or more second grants identifying a second set of resources of a second data channel on which the UE is to perform data communications, and transmitting, based on the monitoring the first set of resources, a feedback message associated with receipt of the one or more second grants.

An apparatus for wireless communication at a UE is described. The apparatus may include a processor, memory coupled with the processor, and instructions stored in the memory. The instructions may be executable by the processor to cause the apparatus to receive, in a control channel, a first grant identifying a first set of resources of a first data channel on which the UE is to monitor for one or more second grants, the first data channel being downlink, monitor the first set of resources in the first data channel for the one or more second grants, the one or more second grants identifying a second set of resources of a second data channel on which the UE is to perform data communications, and transmit, based on the monitoring the first set of resources, a feedback message associated with receipt of the one or more second grants.

Another apparatus for wireless communication at a UE is described. The apparatus may include means for receiving, in a control channel, a first grant identifying a first set of resources of a first data channel on which the UE is to monitor for one or more second grants, the first data channel being downlink, monitoring the first set of resources in the first data channel for the one or more second grants, the one or more second grants identifying a second set of resources of a second data channel on which the UE is to perform data communications, and transmitting, based on the monitoring the first set of resources, a feedback message associated with receipt of the one or more second grants.

A non-transitory computer-readable medium storing code for wireless communication at a UE is described. The code may include instructions executable by a processor to receive, in a control channel, a first grant identifying a first set of resources of a first data channel on which the UE is to monitor for one or more second grants, the first data channel being downlink, monitor the first set of resources in the first data channel for the one or more second grants, the one or more second grants identifying a second set of resources of a second data channel on which the UE is to perform data communications, and transmit, based on the monitoring the first set of resources, a feedback message associated with receipt of the one or more second grants.

Some examples of the method, apparatuses, and non-transitory computer-readable medium described herein may further include operations, features, means, or instructions for monitoring the second set of resources in a second data channel for the data transmission, the second data channel being downlink, and transmitting, based on the monitoring the second set of resources, a second feedback message associated with receipt of the data transmission.

Some examples of the method, apparatuses, and non-transitory computer-readable medium described herein may further include operations, features, means, or instructions for configuring the feedback message with a single indication of whether the one or more second grants were received.

Some examples of the method, apparatuses, and non-transitory computer-readable medium described herein may further include operations, features, means, or instructions for configuring, for each second grant in the one or more second grants, the feedback message with an indication of whether the corresponding second grant was received.

Some examples of the method, apparatuses, and non-transitory computer-readable medium described herein may further include operations, features, means, or instructions for transmitting the feedback message separately from a second feedback message associated with receipt of a data transmission in the first data channel configured by the first grant.

Some examples of the method, apparatuses, and non-transitory computer-readable medium described herein may further include operations, features, means, or instructions for transmitting the feedback message concurrently with a second feedback message associated with receipt of a data transmission in the first data channel configured by the first grant.

Some examples of the method, apparatuses, and non-transitory computer-readable medium described herein may further include operations, features, means, or instructions for transmitting the feedback message in at least one of an uplink control channel, or an uplink data channel, or a combination thereof.

Some examples of the method, apparatuses, and non-transitory computer-readable medium described herein may further include operations, features, means, or instructions for identifying, for the feedback message, an uplink resource on the uplink data channel based on the first grant.

In some examples of the method, apparatuses, and non-transitory computer-readable medium described herein, the second set of resources include provisionally-granted resources based on the monitoring the first set of resources.

Some examples of the method, apparatuses, and non-transitory computer-readable medium described herein may further include operations, features, means, or instructions for monitoring the control channel, based on an indication in the first grant and during a slot occurring after a slot that the first grant may be received in, for a third grant.

Some examples of the method, apparatuses, and non-transitory computer-readable medium described herein may further include operations, features, means, or instructions for monitoring the control channel, during each slot of a set of slots occurring after a slot in which the first grant may be received, for a third grant, receiving the third grant during at least one slot of the set of slots, and refraining, based on an indication in the third grant, from monitoring the control channel during slots of the set of slots occurring after the at least one slot in which the third grant was received.

Some examples of the method, apparatuses, and non-transitory computer-readable medium described herein may further include operations, features, means, or instructions for receiving a configuration signal identifying a set of slots in which to monitor the control channel, the set of slots including a slot in which the first grant was received and one or more slots occurring after the slot in which the first grant was received, and monitoring the control channel according to the configuration signal.

Some examples of the method, apparatuses, and non-transitory computer-readable medium described herein may further include operations, features, means, or instructions for initiating a timer based on receiving the first grant, and monitoring, while the timer may be running, the control channel during each slot occurring after a slot in which the first grant may be received.

Some examples of the method, apparatuses, and non-transitory computer-readable medium described herein may further include operations, features, means, or instructions for receiving, based at least on monitoring the control channel, a third grant in the control channel, and resetting the timer based on receiving the third grant.

Some examples of the method, apparatuses, and non-transitory computer-readable medium described herein may further include operations, features, means, or instructions for determining that the timer may have expired, and refraining from monitoring the control channel based on expiry of the timer.

In some examples of the method, apparatuses, and non-transitory computer-readable medium described herein, the first grant in the control channel may be received, the first set of resources in the first data channel may be monitored, and the feedback message may be transmitted in one or more slots occurring before the second set of resources of the second data channel on which the UE may be to perform the data communications.

A method of wireless communication at a base station is described. The method may include transmitting, in a control channel, a first grant identifying a first set of resources of a first data channel on which a UE is to monitor for one or more second grants, the first data channel being downlink, transmitting the one or more second grants in the first data channel using the first set of resources, the one or more second grants identifying a second set of resources of a second data channel on which the UE is to perform data communications, and receiving, based on the UE monitoring the first set of resources, a feedback message associated with receipt of the one or more second grants.

An apparatus for wireless communication at a base station is described. The apparatus may include a processor, memory coupled with the processor, and instructions stored in the memory. The instructions may be executable by the processor to cause the apparatus to transmit, in a control channel, a first grant identifying a first set of resources of a first data channel on which a UE is to monitor for one or more second grants, the first data channel being downlink, transmit the one or more second grants in the first data channel using the first set of resources, the one or more second grants identifying a second set of resources of a second data channel on which the UE is to perform data communications, and receive, based on the UE monitoring the first set of resources, a feedback message associated with receipt of the one or more second grants.

Another apparatus for wireless communication at a base station is described. The apparatus may include means for transmitting, in a control channel, a first grant identifying a first set of resources of a first data channel on which a UE is to monitor for one or more second grants, the first data channel being downlink, transmitting the one or more second grants in the first data channel using the first set of resources, the one or more second grants identifying a second set of resources of a second data channel on which the UE is to perform data communications, and receiving, based on the UE monitoring the first set of resources, a feedback message associated with receipt of the one or more second grants.

A non-transitory computer-readable medium storing code for wireless communication at a base station is described. The code may include instructions executable by a processor to transmit, in a control channel, a first grant identifying a first set of resources of a first data channel on which a UE is to monitor for one or more second grants, the first data channel being downlink, transmit the one or more second grants in the first data channel using the first set of resources, the one or more second grants identifying a second set of resources of a second data channel on which the UE is to perform data communications, and receive, based on the UE monitoring the first set of resources, a feedback message associated with receipt of the one or more second grants.

Some examples of the method, apparatuses, and non-transitory computer-readable medium described herein may further include operations, features, means, or instructions for transmitting a data transmission in the second set of resources in the second data channel, the second data channel being downlink, and receiving, based on the UE monitoring the second set of resources, a second feedback message associated with receipt of the data transmission.

Some examples of the method, apparatuses, and non-transitory computer-readable medium described herein may further include operations, features, means, or instructions for determining that the feedback message includes a single indication of whether the one or more second grants were received.

Some examples of the method, apparatuses, and non-transitory computer-readable medium described herein may further include operations, features, means, or instructions for determining, for each second grant in the one or more second grants, that the feedback message includes an indication of whether the corresponding second grant was received.

Some examples of the method, apparatuses, and non-transitory computer-readable medium described herein may further include operations, features, means, or instructions for receiving the feedback message separately from a second feedback message associated with receipt of a data transmission configured by the first grant.

Some examples of the method, apparatuses, and non-transitory computer-readable medium described herein may further include operations, features, means, or instructions for receiving the feedback message concurrently with a second feedback message associated with receipt of a data transmission configured by the first grant.

Some examples of the method, apparatuses, and non-transitory computer-readable medium described herein may further include operations, features, means, or instructions for receiving the feedback message in at least one of an uplink control channel, or an uplink data channel, or a combination thereof.

Some examples of the method, apparatuses, and non-transitory computer-readable medium described herein may further include operations, features, means, or instructions for configuring the first grant to identify an uplink resource on the uplink data channel for the feedback message.

Some examples of the method, apparatuses, and non-transitory computer-readable medium described herein may further include operations, features, means, or instructions for determining, based on the feedback message, that the UE received the one or more second grants, and transmitting a data transmission in the second set of resources.

Some examples of the method, apparatuses, and non-transitory computer-readable medium described herein may further include operations, features, means, or instructions for determining that the UE did not receive the one or more second grants, and reallocating the second set of resources based on the determining.

Some examples of the method, apparatuses, and non-transitory computer-readable medium described herein may further include operations, features, means, or instructions for configuring the first grant to indicate for the UE to monitor the control channel for a third grant during a slot occurring after a slot that the first grant may be transmitted in.

Some examples of the method, apparatuses, and non-transitory computer-readable medium described herein may further include operations, features, means, or instructions for transmitting a third grant in the control channel during a slot of a set of slots occurring after a slot in which the first grant may be transmitted, the third grant indicating for the UE to refrain from monitoring the control channel during slots of the set of slots occurring after the slot in which the third grant was transmitted.

Some examples of the method, apparatuses, and non-transitory computer-readable medium described herein may further include operations, features, means, or instructions for transmitting a configuration signal identifying a set of slots in which the UE may be to monitor the control channel, the set of slots including a slot in which the first grant was transmitted and one or more slots occurring after the slot in which the first grant was transmitted.

In some examples of the method, apparatuses, and non-transitory computer-readable medium described herein, the first grant in the control channel may be transmitted, the first set of resources in the first data channel occur, and the feedback message may be received in one or more slots occurring before the second set of resources of the second data channel on which the UE may be to perform the data communications.

DETAILED DESCRIPTION

Figure 1:
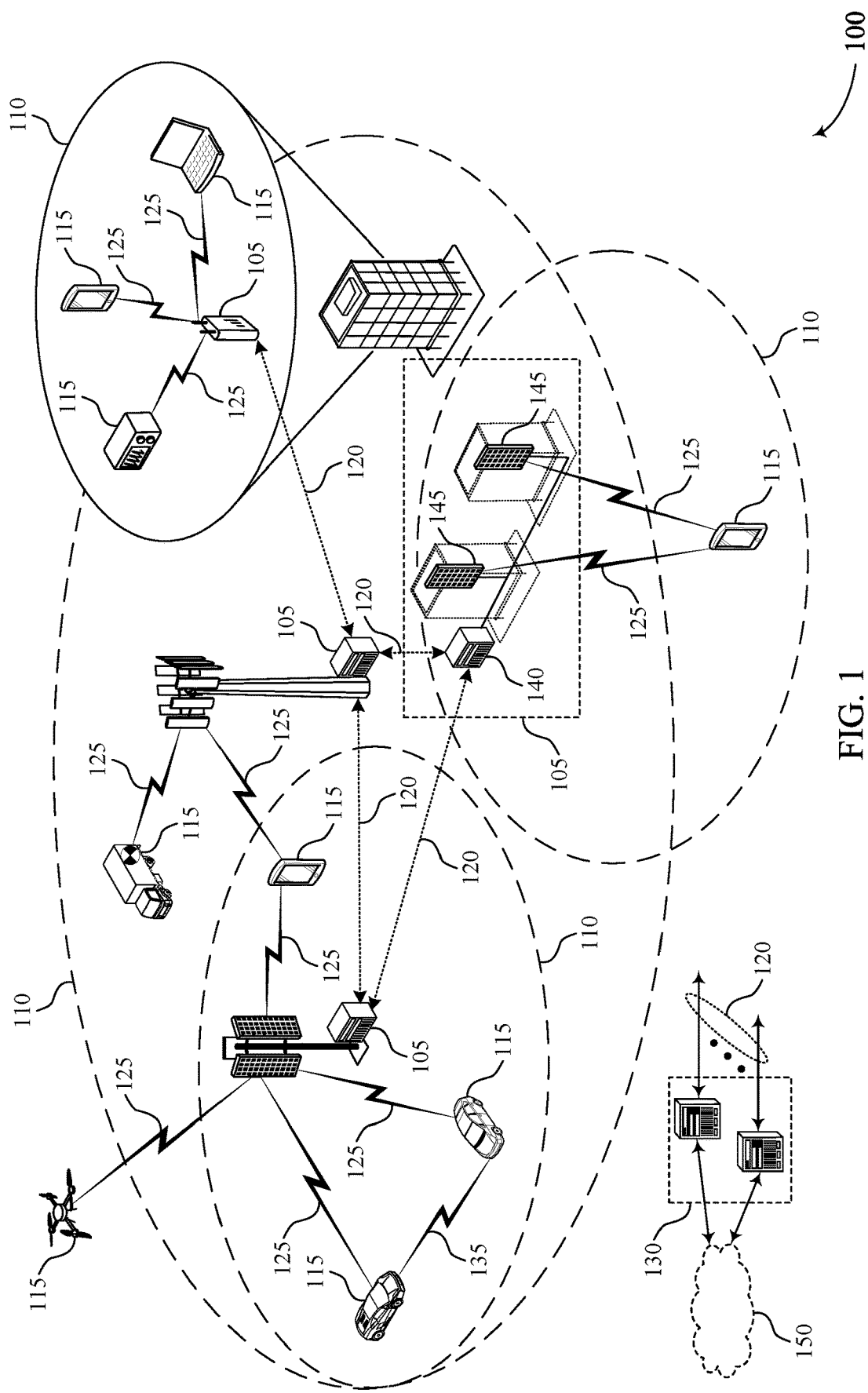
FIG. 1 illustrates an example of a system for wireless communications that supports robustness enhancement for downlink control information in a downlink data channel in accordance with aspects of the present disclosure.

Some wireless communication systems may support a base station providing a grant (e.g., a downlink control information (DCI) grant) to a user equipment (UE) in a data channel (e.g., a physical downlink shared channel (PDSCH)). This may support reducing the control channel (e.g., a physical downlink control channel (PDCCH)) monitoring occasions/density to save power at the UE. However, some techniques result in ambiguity with regards to acknowledgment/negative-acknowledgment (ACK/NACK) information provided in a feedback message. For example, some techniques using a hybrid automatic repeat/request (HARQ) codebook result in the base station being unable to determine whether a NACK indication in a feedback message is associated with the grant scheduling a data transmission or the data transmission. Accordingly, aspects of the described techniques provide various mechanisms to improve the robustness for a grant received in a data channel to avoid such confusion.

Aspects of the disclosure are initially described in the context of a wireless communications system. Generally, the described techniques provide for various techniques that improve performance of a grant conveyed in a downlink data channel. For example, a base station may transmit or otherwise convey a first grant (e.g., downlink control information (DCI) grant, which may be referred to as $DCI_{CORESET}$, wherein CORESET refers to the control resource set configured for the UE to receive the DCI grant) in a control channel (e.g., a PDCCH) to a UE. The first grant may carry or otherwise convey an indication of a corresponding first set of resources of a first data channel (e.g., a first PDSCH) that the UE is to monitor for receiving additional grants. The UE may monitor the first set of resources (e.g., as identified in the first grant) to receive one or more second grants (e.g., $DCI_{PDSCH}$ grant(s) and/or $DCI_{PDSCH}$ grant(s)). Generally, the second grants may carry or otherwise convey information identifying a second set of resources of a second data channel (e.g., second PDSCH resources and/r PUSCH resources) on which the UE is to perform (e.g., receive and/or transmit) data communications. The UE may transmit or otherwise provide an indication of a feedback message associated with receipt of the one or more second grants based on the monitoring of the first set of resources. That is, the UE may provide ACK/NACK information in a feedback message to the base station indicating whether or not the one or more second grants were received and/or successfully decoded by the UE. In some examples, the resources allocated by the second grant(s) may be provisionally allocated resources depending upon whether or not the UE acknowledges receipt (e.g., in the feedback message) of the second grant(s). For example, if the feedback message indicates that the UE received the second grant(s), the base station may perform the data communications over the second set of resources to the UE. If the feedback message indicates that the UE did not receive the second grant(s) (or if a feedback message was not received at all by the base station), the base station may reallocate the second set of resources (e.g., to the UE, to a different UE, etc.) to avoid waste. For example, the base station can reallocate the second set of resources to the same UE as well as a different UE. That is, after canceling a PDSCH allocation indicated by a NACKed DCI, the base station may attempt to allocate the resource to the same UE again by retransmitting the DCI. Accordingly, aspects of the described techniques provide a mechanism that improves the performance of the $DCI_{PDSCH}$ grant(s) (e.g., the second grant(s)) received in the first data channel, the first data channel being downlink.

Aspects of the disclosure are further illustrated by and described with reference to apparatus diagrams, system diagrams, and flowcharts that relate to robustness enhancement for downlink control information in a downlink data channel.

FIG. 1 illustrates an example of a wireless communications system 100 that supports robustness enhancement for downlink control information in a downlink data channel in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (in other words, directly between base stations 105), or indirectly (in other words, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology. The "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology, such as LTE, LTE-A, LTE-A Pro, or NR. Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode in which initial acquisition and connection may be conducted by the UEs 115 via the carrier, or the carrier may be operated in a non-standalone mode in which a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications, such as in an FDD mode, or may be configured to carry downlink and uplink communications, such as in a TDD mode.

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band or a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier. The symbol period and subcarrier spacing may be inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds. $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region, such as a control resource set (CORESET), for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions, such as mission critical functions. Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other examples, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device, such as a base station 105.

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), in which multiple spatial layers are transmitted to the same receiving device, and multiple-user MIMO (MU-MIMO), in which multiple spatial layers are transmitted to multiple devices.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback. For same-slot HARQ feedback, the device may provide HARQ feedback in a specific slot for data received in a previous symbol in the slot. In other examples, the device may provide HARQ feedback in a subsequent slot, or according to some other time interval.

A base station 105 in the wireless communications system 100 may communicate with one or more UEs 115 using multicast transmissions. A multicast transmission by a base station 105 may be a single transmission (for example, a single message or packet) to a group of multiple UEs 115, for example in a multicast communication channel. The one or more UEs 115 may receive the multicast messaging by monitoring particular channels for multicast messages.

A broadcast transmission may by a base station 105 may be a single transmission to multiple UEs 115 without being addressed or otherwise directed to a particular group of UEs 115. The broadcast transmissions may be sent on a multicast communication channel in some cases, together with, or instead of, multicast transmissions. In some examples, the techniques described herein for multicast transmissions may be applied to broadcast transmissions, for example broadcast transmissions sent on a multicast channel.

A UE 115 may receive, in a control channel, a first grant identifying a first set of resources of a first data channel on which the UE 115 is to monitor for one or more second grants, the first data channel being downlink. The UE 115 may monitor the first set of resources in the first data channel for the one or more second grants, the one or more second grants identifying a second set of resources of a second data channel on which the UE 115 is to perform data communications. The UE 115 may transmit, based at least in part on the monitoring the first set of resources, a feedback message associated with receipt of the one or more second grants.

A base station 105 may transmit, in a control channel, a first grant identifying a first set of resources of a first data channel on which a UE 115 is to monitor for one or more second grants. The base station 105 may transmit the one or more second grants in the first data channel using the first set of resources, the one or more second grants identifying a second set of resources of a second data channel on which the UE 115 is to perform data communications. The base station 105 may receive, based at least in part on the UE 115 monitoring the first set of resources, a feedback message associated with receipt of the one or more second grants.

Figure 2:
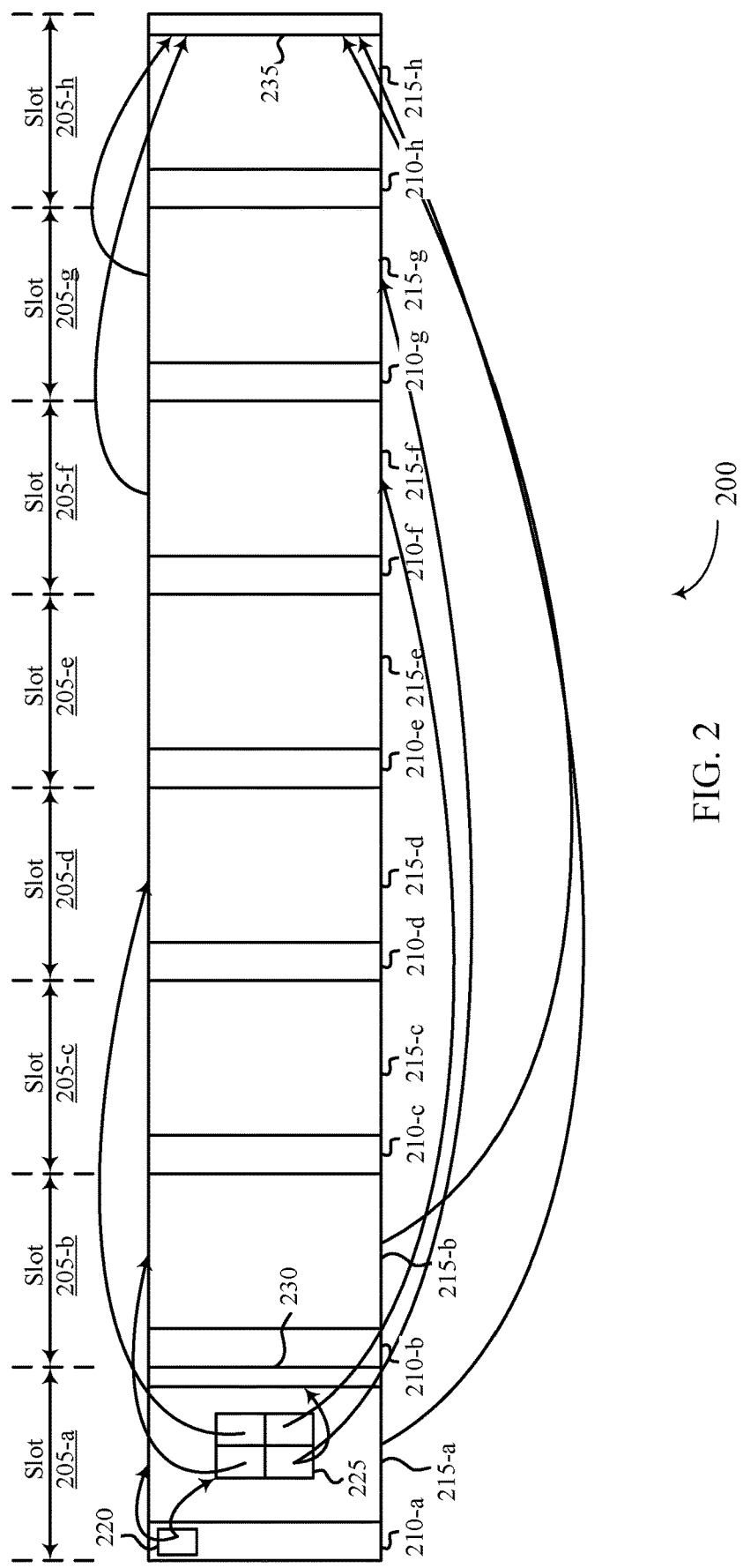
FIG. 2 illustrates an example of a slot configuration that supports robustness enhancement for downlink control information in a downlink data channel in accordance with aspects of the present disclosure.

FIG. 2 illustrates an example of a slot configuration 200 that supports robustness enhancement for downlink control information in a downlink data channel in accordance with aspects of the present disclosure. In some examples, slot configuration 200 may implement aspects of wireless communication system 100. Aspects of slot configuration 200 may be implemented by UE and/or a base station, which may be examples of the corresponding devices described herein.

Generally, slot configuration 200 may include a plurality of slots 205, with eight slots 205 being shown by way of example only. It is to be understood that slot configuration 200 may include more or less than eight slots 205. Generally, each slot 205 may have a control portion 210 in which various control information is communicated over one or more control channels and a data portion 215 in which various data information, and control information in some examples, is communicated over one or more data channels. Examples of the control channels include, but are not limited to, PDCCH. Examples of the data channel include, but are not limited to, PDSCH and/or PUSCH. In some aspects, the UE may be configured with a CORESET identifying a PDCCH monitoring occasion in the control portion 210 of at least some of the slots 205.

Some wireless communication systems may support communications in a higher frequency band (e.g., 60 GHz). This may result in shorter duration for slots 205 as compared to communications in a lower frequency band (e.g., Frequency Range one (FR1), FR two (FR2), etc.). In some aspects, the shorter duration for slots 205 in a higher frequency band may be based on the subcarrier spacing (SCS) for such higher frequency bands. For example, communications in a higher frequency band (e.g., FR three (FR3), FR four (FR4), etc.) may utilize SCS of 960 kHz, 1.92 MHz, 3.84 MHz, and the like. Having a shorter duration of slots 205 may result in the number of PDCCH monitoring occasions increasing. For example, the frequency in which the control portion 210 of slots 205 occurs is higher as the SCS increases. This may result in, or otherwise lead to, increased power consumption by a UE. Due to the short slot 205 duration and narrow analog beamforming transmission, the chance of the base station sending multiple DCIs to different UEs is greatly reduced in higher frequency bands (e.g., FR3/FR4) as compared to lower frequency bands (e.g., FR1/FR2).

Instead, some techniques may include the base station sending multiple DCIs (e.g., grants) to the same UE (e.g., for bursty traffic). In some examples, this may include the base station sending a first grant 220 in the control portion 210 and over a control channel (e.g., a PDCCH DCI grant, which may be illustrated as $DCI_{CORESET}$). This may also include the base station sending one or more second grants 225 in the data portion 215 and over a first data channel (e.g., a PDSCH and/or PUSCH DCI grant, which may be illustrated as $DCI_{PDSCH/PUSCH(s)}$). This may support reducing the PDCCH monitoring density to improve micro-sleep at the UE.

In some aspects, utilizing the one or more second grants 225 in the data portion 215 may include intermittent PDCCH monitoring occasions. For example, the base station and/or UE may be configured such that the UE only monitors some of the control portions 210 of slots 205. For example, the UE may be configured to monitor every other, every third, every fourth, etc., of the control portions 210 of slots 205. In one example, the UE may be configured to monitor a plurality of the slots 205 in which to monitor the control portions 210. In some aspects, this may include the UE monitoring its configured CORESET for the first grant 220 (e.g., the $DCI_{CORESET}$ in the CORESET) in addition to resources configured by the first grant 220 for the one or more second grants 225 (e.g., the $DCI_{PDSCH/PUSCH(s)}$ on the PDSCH/PUSCH of data portion 215 assigned by $DCI_{CORESET}$). That is, the first grant 220 may identify the first set of resources of the first data channel (e.g., in the data portion 215) on which the UE is to monitor for the one or more second grants 225. Accordingly, the $DCI_{CORESET}$ may carry or otherwise include the $DCI_{PDSCH/PUSCH(s)}$ allocation information and, in some examples, the common portions of the one or more second grants 225 (e.g., the $DCI_{PDSCH/PUSCH(s)}$). In some aspects, the first grant 220 (e.g., the $DCI_{CORESET}$) may also carry or convey a regular grant, e.g., a grant for a corresponding data transmission.

In some wireless communication systems, multiple ACK/NACKs are fed back to the base station at the same time using a HARQ ACK codebook. However, this may introduce ambiguity for the base station in terms of interpreting a NACK. For example, base station may not know whether the UE failed to receive the first grant 220 (e.g., the $DCI_{CORESET}$) or the data transmission (e.g., PDSCH) assigned by the first grant 220. In another example, the base station may not know whether the UE failed to receive the one or more second grants 225 (e.g., $DCI_{PDSCH/PUSCH(s)}$) or the data transmission (e.g., PDSCH/PUSCH) assigned by the corresponding one or more second grants 225.

Some techniques may include adding a discontinuous transmission (DTX) indicator in addition to the ACK and NACK information at each reporting occasion in the HARQ codebook. For example, the DTX indicator may be added in one or more of the slots 205 and may provide additional information that can be used by the base station to determine whether the UE failed to receive the grant. That is, DTX may indicate that the UE missed the DCI (and therefore did not try to decode the corresponding PDSCH). If the UE successfully receives the DCI, then the UE tries to decode the PDSCH and sends ACK or NACK depending on whether the PDSCH is successfully decoded or not. In addition to the increased feedback overhead, the benefits of adding more bits may be marginable. For example, this approach may include the base station being able to control the separate outer-loop link adaptation for PDSCH and DCI more accurately, e.g., depending on NACK or DTX. This approach may also include the base station being able to control the new data indicator (NDI) and/or redundancy version (RV) more efficiently, e.g., depending on NACK or DTX. However, this approach may include the base station waiting for the next PDCCH monitoring occasion to retransmit the PDSCHs. For example, if the first grant 220 (e.g., $DCI_{CORESET}$) is missing, all of the slots in the PDCCH monitoring period may be wasted.

Accordingly, aspects of the described techniques improve the performance (e.g., robustness) of utilizing the one or more second grants 225. Broadly, the described techniques may include the base station transmitting (and the UE receiving) the first grant 220 in the control channel (e.g., in the control portion 210-a of slot 205-a). The base station may transmit the first grant 220 in the first slot 205 of the PDCCH monitoring period (e.g., in slot 205-a of the plurality of slots comprising slots 205-a through 205-h). In some aspects, the first grant 220 may carry or otherwise convey an indication of information identifying a first set of resources of a first data channel that UE is to monitor for one or more second grants 225. For example, the first grant 220 in the control portion 210-a of slot 205-a may carry or convey information identifying the resources (e.g., time, frequency, spatial, code, etc., resources) of the data portion 215-a of slot 205-a which will be used to transmit the one or more second grants 225, with four second grants 225 being shown by way of example only. In some aspects, the first grant 220 may also identify resources for a data transmission (e.g., the first grant 220 may also be configured as a conventional grant). In the example illustrated in FIG. 2, the first grant 220 identifies the first set of resources used for the one or more second grants 225 and identifies resources in the data portion 215-a of slot 205-a in which a data transmission (e.g., PDSCH transmission) is scheduled.

Accordingly, the UE may monitor the first set of resources in the first data channel for the one or more second grants 225. Broadly, each of the one or more second grants 225 may carry or convey information identifying a second set of resources of a second data channel in which the UE is to perform data communications. That is, each of the one or more second grants 225 (e.g., each $DCI_{PDSCH/PUSCH}$ grant) may be a downlink grant for a data transmission (e.g., PDSCH transmission) for the UE and/or an uplink grant for a data transmission (e.g., PUSCH) from the UE. In the example illustrated in FIG. 2, the four second grants 225 identify resources for multiple slots in which the base station is to provide the data transmission to the UE. For example, a first of the one or more second grants 225 (upper-left corner) may identify a second set of resources for a data transmission in the data portion 215-b of slot 205-b. A second of the one or more second grants 225 (upper-right corner) may identify a second set of resources for a data transmission in the data portion 215-d of slot 205-d. A third of the one or more second grants 225 (bottom-left corner) may identify a second set of resources for a data transmission in the data portion 215-g of slot 205-g. A fourth of the one or more second grants 225 (bottom-right corner) may identify a second set of resources for a data transmission in the data portion 215-f of slot 205-f. Again, although the example illustrated in FIG. 2 includes four of the one or more second grants 225, it is to be understood that more or fewer of the one or more second grants 225 may be scheduled by the first grant 220.

Accordingly, the UE may monitor the first set of resources in the first data channel for the one or more second grants 225 based on the first grant 220 identifying the first set of resources. Based on the result of the monitoring, the UE may transmit or otherwise provide a feedback message associated with receipt of the one or more second grants 225. In the example illustrated in FIG. 2, the feedback message may be transmitted in an uplink portion 230 (e.g., the last one, two, three, etc., symbols) of the slot 205-a, although it is to be understood that the feedback message may be transmitted in a subsequent slot (e.g., in slot 205-b, 205-c, etc.). In some aspects, the resources for the feedback message (e.g., the resources for the uplink portion 230) may be provided in the first grant 220, in at least one of the one or more second grants 225, and/or may be separately configured (e.g., using RRC signaling, a MAC control element (CE), etc.).

That is, the UE may monitor the first set of resources to receive the one or more second grants 225, and then provide the feedback message based on whether the one or more second grants 225 are received and successfully decoded by the UE. If each of the one or more second grants 225 scheduled by the first grant 220 are received and decoded, the UE may configure the feedback message to signal ACK information to the base station for the one or more second grants 225. If none of the one or more second grants 225 scheduled by the first grant 220 are received, the UE may simply not provide a feedback message or may configure the feedback message to signal NACK (or DTX) information to the base station.

In some aspects, the feedback message may be configured with a single indication of whether the one or more second grants 225 are received and decoded. That is, in some examples one ACK/NACK bit may be assigned in the feedback message for all of the one or more second grants 225 (e.g., for all of the $DCI_{PDSCH/PUSCH(s)}$). In some aspects, the feedback message may be configured with an indication of whether each of the corresponding one or more second grants 225 are received and decoded. That is, in some examples one ACK/NACK bit may be assigned in the feedback message for each of the one or more second grants 225 (e.g., for each of the $DCI_{PDSCH/PUSCH(s)}$).

In some aspects, there may be options available regarding whether the feedback message (e.g., the ACK/NACK information) for the one or more second grants 225 (e.g., $DCI_{PDSCH(s)}$) are fed back concurrently or separately with the second feedback message (e.g., ACK/NACK information) for the data transmissions (PDSCH) assigned by the first grant 220 (e.g., $DCI_{CORESET}$).

In one option, the feedback message for the one or more second grants 225 may be transmitted separately from the second feedback message associated with receipt of a data transmission configured by the first grant 220. That is, the ACK/NACK(s) of the one or more second grants 225 (e.g., $DCI_{PDSCH/PUSCH}$) may be fed back explicitly (e.g., separately from an ACK/NACK for a PDSCH assigned by the $DCI_{CORESET}$). In the example illustrated in FIG. 2, this may include the UE transmitting the second feedback message in uplink portion 235 of the data portion 215-h of slot 205-h. Accordingly, the feedback message (e.g., ACK/NACK information) for the one or more second grants 225 (e.g., $DCI_{PDSCH/PUSCH}$) is fed back early, while the second feedback message for the data transmission (e.g., PDSCH) assigned by the first grant 220 (e.g., $DCI_{CORESET}$) is fed back later (e.g., concurrently with the ACK/NACK information for the data transmissions assigned by the one or more second grants 225).

In another option, the feedback message (e.g., ACK/NACK information) for the one or more second grants (e.g., $DCI_{PDSCH/PUSCH}$) is fed back concurrently with the second feedback message associated with receipt of the data transmission configured by the first grant 220. That is, the ACK/NACK for the $DCI_{PDSCH/PUSCH}$ is fed back concurrently with the ACK/NACK for the PDSCH assigned by the first grant 220 (e.g., $DCI_{CORESET}$). In some aspects, both feedback messages may be fed back earlier than the ACK/NACK for the PDSCH/PUSCH(s) assigned by the one or more second grants 225 (e.g., the ACK/NACK information or the DPSCH/PUSCH assigned by the $DCI_{PDSCH/PUSCH(s)}$).

As discussed, the feedback messages may be transmitted in an uplink portion, such as uplink portions 230 and/or 235 in accordance with aspects of the described techniques. With regards to the feedback message transmitted in response to the one or more second grants 225, there may be options available regarding which uplink signal (e.g., which uplink resource) is used for transmitting the ACK/NACK information for the one or more second grants 225 (e.g., $DCI_{PDSCH/PUSCH}$). Broadly, the feedback message may be transmitted in an uplink control channel (e.g., a physical uplink control channel (PUCCH)) and/or in an uplink data channel (e.g., a PUSCH). For example, the feedback message (e.g., ACK/NACK information) for the one or more second grants 225 (e.g., $DCI_{PDSCH/PUSCH}$) may be fed back via PUCCH and/or PUSCH. In some examples, the first grant 220 (e.g., $DCI_{CORESET}$) may carry, contain, or otherwise identify a downlink grant for both a data transmission (PDSCH) and the one or more second grants 225 (e.g., $DCI_{PDSCH/PUSCH}$) and an uplink grant (e.g., for ACK/NACK information fed back in the feedback message) of uplink resources. Accordingly, the base station may configure the first grant to provide information identifying uplink resources on the uplink data channel for the UE to use for transmitting the feedback message.

In some aspects, the second set of resources configured by the one or more second grants 225 may be provisionally granted resources. That is, the second set of resources may be provisionally allocated to the UE in the one or more second grants 225, but may be reallocated based on a result of the UE receiving and decoding the one or more second grants 225, e.g., based on the feedback message. For example, if the feedback message indicates that the UE received the one or more second grants 225, the base station may perform the corresponding data communications using the second set of resources identified in the one or more second grants 225. However, if the feedback message indicates (or simply is not received by the base station) that the UE did not receive the one or more second grants 225 (or at least one of the one or more second grants 225, depending upon the configuration of the feedback message), the base station may reallocate the second set of resources (e.g., to the same UE, to a different UE, etc.) to avoid waste. Accordingly, until the ACK/NACK information for the $DCI_{PDSCH/PUSCH}$ are reported in the feedback message, the PDSCH/PUSCH resources assigned by $DCI_{PDSCH/PUSCH}$ are provisional. If the one or more second grants 225 are ACKed, the base station may transmit the PDSCH and the UE may decode the PDSCH at the corresponding slot 205. If the one or more second grants 225 are NACKed (or DTXed), the base station may cancel the PDSCH transmission assigned by the $DCI_{PDSCH}$ and retransmit the $DCI_{CORESET}$ at the next PDCCH monitoring occasion. The base station may reallocate the second set of resources, in some examples.

Accordingly, the UE may monitor the second set of resources in the second data channel (e.g., second PDSCH/PUSCH communications) for the data transmissions and transmit, based on the monitoring, a second feedback message associated with receipt of the data transmissions. For example, the UE may receive the data transmissions in the corresponding data portions 215-a, 215-b, 215-d, 215-f, and 215-g of slots 205-a, 205-b, 205-d, 205-f, and 205-g, respectively, and transmit a second feedback message during the uplink portion 235 (e.g., PUCCH and/or PUSCH) of slot 205-h.

Accordingly, slot configuration 200 illustrates an example where all of the HARQ feedback of $DCI_{PDSCH/PUSCH}$ are ACKed, e.g., using one ACK/NACK bit assigned for each $DCI_{PDSCH/PUSCH}$ or using one ACK/NACK bit assigned for all $DCI_{PDSCH/PUSCH}$.

Accordingly, slot configuration 200 illustrates an example where the UE provides explicit ACK/NACK information reporting in a feedback message indicating whether the UE received the one or more second grants 225 from the base station. This may improve the robustness and/or reliability of communicating the one or more second grants 225 in the first data channel for the UE.

Figure 3:
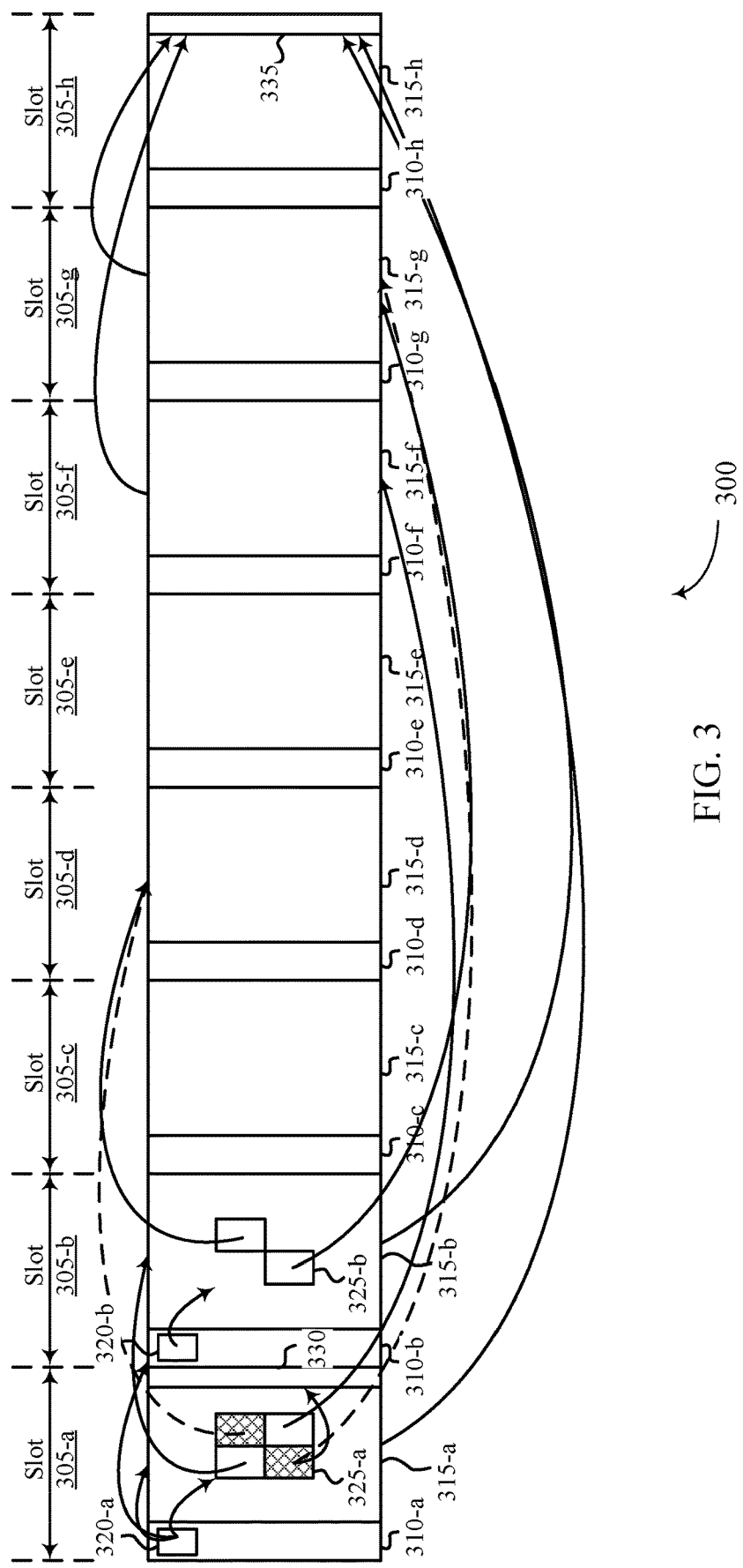
FIG. 3 illustrates an example of a slot configuration that supports robustness enhancement for downlink control information in a downlink data channel in accordance with aspects of the present disclosure.

FIG. 3 illustrates an example of a slot configuration 300 that supports robustness enhancement for downlink control information in a downlink data channel in accordance with aspects of the present disclosure. In some examples, slot configuration 300 may implement aspects of wireless communication system 100 and/or slot configuration 200. Aspects of slot configuration 300 may be implemented by UE and/or a base station, which may be examples of the corresponding devices described herein.

Generally, slot configuration 300 may include a plurality of slots 305, with eight slots 305 being shown by way of example only. It is to be understood that slot configuration 300 may include more or less than eight slots 305. Generally, each slot 305 may have a control portion 310 in which various control information is communicated over one or more control channels and a data portion 315 in which various data information, and control information in some examples, is communicated over one or more data channels. Examples of the control channels include, but are not limited to, PDCCH. Examples of the data channel include, but are not limited to, PDSCH and/or PUSCH.

Broadly, slot configuration 300 illustrates an example where the UE is configured with one or more PDCCH monitoring slots 305 within a PDCCH monitoring period. In some aspects, the PDCCH monitoring period may correspond to a set of (or plurality of) slots 305 in which the UE is configured for communications and the PDCCH monitoring slots 305 may include a subset of the slots 305 in which the UE is to monitor the control channel.

For example, the UE may be configured to monitor the control portion 310-a of slot 305-a to receive a first grant 320-a transmitted from a base station. The first grant 320-a may carry or otherwise convey an indication of a first set of resources of a first data channel on which the UE is to monitor for one or more second grants 325-a, with four of the one or more second grants 325 being shown by way of example only. The first grant 320-a may additionally identify resources for a data transmission (e.g., a PDSCH transmission within the data portion 315-a of slot 305-a). The UE may then monitor the first set of resources in the first data channel (e.g., first PDSCH) for the one or more second grants 325-a. The one or more second grants 325-a may carry or convey information identifying a second set of resources of a second data channel on which the UE is to perform data communications.

In the example illustrated in FIG. 3, the first grant 320-a may identify the first set of resources corresponding to four downlink grants in the first data channel corresponding to the one or more second grants 325-a. For example, the four second grants 325-a may identify resources for multiple slots in which the base station is to perform data communications with the UE. For example, a first of the one or more second grants 325-a (upper-left corner) may identify a second set of resources for a data transmission in the data portion 315-b of slot 305-b. A second of the one or more second grants 325-a (upper-right corner) may identify a second set of resources for a data transmission in the data portion 315-d of slot 305-d. A third of the one or more second grants 325-a (bottom-left corner) may identify a second set of resources for a data transmission in the data portion 315-g of slot 305-g. A fourth of the one or more second grants 325-a (bottom-right corner) may identify a second set of resources for a data transmission in the data portion 315-f of slot 205-f Again, although the example illustrated in FIG. 3 includes four of the one or more second grants 325, it is to be understood that more or fewer of the one or more second grants 325 may be scheduled by the first grant 320-a.

However, the UE may fail to receive or properly decode the one or more second grants 325 scheduling data transmissions in slots 305-d and 305-g (e.g., as indicated by the dashed lines). For example, the UE may fail to receive or properly decode the one or more second grants 325 due to interference, collision, and the like. Accordingly and based on a result of the monitoring of the first set of resources, the UE may successfully receive and decode the one or more second grants 325-a scheduling data transmissions in slots 305-b and 305-f.

Accordingly, based on a result of monitoring the first set of resources, the UE may determine that it has ACK information to report in a feedback message for the one or more second grants 325-a scheduling data transmissions in slots 305-b and 305-f, but determine that it has NACK information to report in the feedback message for the one or more second grants 325-a scheduling data transmissions in slots 305-d and 305-g. Based on the result of the monitoring and determination, the UE may transmit or otherwise provide a feedback message associated with receipt of the one or more second grants 325-a. In the example illustrated in FIG. 3, the feedback message may be transmitted in an uplink portion 330 (e.g., the last one, two, three, etc., symbols) of the slot 305-a, although it is to be understood that the feedback message may be transmitted in a subsequent slot (e.g., in slot 305-b, 305-c, etc.). In some aspects, the resources for the feedback message (e.g., the resources for the uplink portion 330) may be provided in the first grant 320, in at least one of the one or more second grants 325-a, and/or may be separately configured (e.g., using RRC signaling, a MAC CE, etc.).

However, the UE may also be configured with additional PDCCH monitoring slots 305 in which to receive a third grant (e.g., a retransmission of the first grant 320-b) from the base station. That is, when a $DCI_{CORESET}$ is sent in PDCCH monitoring slot 305-a, the UE may monitor PDCCH(s) in the following slot(s) 305 (e.g., in slot 305-b). Based on the feedback message, a base station may retransmit at least a portion of the first grant 320-b (e.g., the third grant) in the control portion 310-b of the slot 305-b. The first grant 320-b may identify the first set of resources of the first data channel (e.g., PDSCH) on which the UE is to monitor for the one or more second grants 325-b (e.g., a retransmission of the one or more second grants 325-a that were NACKed in the feedback message). For example, the base station may, based on the NACK information received in the feedback message transmitted during uplink portion 330, retransmit the one or more second grants 325-b that were NACKed in the initial feedback message. The UE may then transmit another feedback message providing ACK/NACK information for the one or more second grants 325-b received in the data portion 315-b of slot 305-b.

As discussed, the feedback messages may be transmitted in an uplink portion, such as uplink portions 330 and/or 335 in accordance with aspects of the described techniques. Broadly, the feedback message may be transmitted in PUCCH and/or in PUSCH. For example, the feedback message (e.g., ACK/NACK information) for the one or more second grants 325-b (e.g., $DCI_{PDSCH/PUSCH}$) may be fed back via PUCCH and/or PUSCH. In some examples, the first grant 320-a (e.g., $DCI_{CORESET}$) may carry, contain, or otherwise identify a downlink grant for both a data transmission (PDSCH) and the one or more second grants 325 (e.g., $DCI_{PDSCH}$) and an uplink grant (e.g., for ACK/NACK information fed back in the feedback message). Accordingly, the base station may configure the first grant 320 to provide information identifying uplink resources on the uplink data channel for the UE to use for transmitting the feedback message.

Accordingly, the UE may monitor the second set of resources in the second data channel for the data transmissions and transmit, based on the monitoring, a second feedback message associated with receipt of the data transmissions. For example, the UE may receive the data transmissions in the corresponding data portions 315-a, 315-b, 315-d, 315-f, and 315-g of slots 305-a, 305-b, 305-d, 305-f, and 305-g, respectively, and transmit a second feedback message during the uplink portion 335 (e.g., PUCCH and/or PUSCH) of slot 305-h.

As discussed, the UE may be configured with additional PDCCH monitoring slots 305 in accordance with aspects of the described techniques. Providing the UE with information indicating or otherwise identifying which additional PDCCH monitoring slots 305 that the UE is to monitor may be performed according to various options.

In one option, this may include the UE being configured to monitor the following X slots 305 occurring after the slot 305 in which the first grant 320-a (e.g., $DCI_{CORESET}$) is received, with X being a positive integer. This may be preconfigured for the UE, configured by various signaling (e.g., RRC signaling, a MAC CE, upper layer signaling, etc.), and the like. In one example, this may include using a dynamic CORESET indication, e.g., the first grant 320-a (e.g., $DCI_{CORESET}$) indicating for the UE to monitor the PDCCH occasion (e.g., the CORESET configured in the control portion 310) for additional slots 305, such as the location information for the next PDCCH monitoring occasion occurring in a slot 305. For example, the UE may be provided with a slot index corresponding to the slot(s) 305 in which the UE is to monitor for the control information. Thus, the location (e.g. slot index) of the PDCCH occasion may be included in the first grant 320-a (e.g. the $DCI_{CORESET}$). Accordingly, the UE may monitor the control channel, based at least in part on an indication in the first grant and during a slot 305 occurring after the slot 305 that the first grant is received in, for a third grant (e.g., the retransmission of the first grant 320-b and/or for the retransmission of the one or more second grants 325-b in slot 305-b).

Another option may include using a PDCCH monitoring skipping signal. For example, when the UE detects the first grant 320-a (e.g., $DCI_{CORESET}$) in the intermittent PDCCH monitoring occasion, the UE may monitor all of the slots 305 within the PDCCH monitoring period until the next PDCCH monitoring occasion. When the base station receives all ACKs for the one or more second grants 325 (e.g., when the base station determines that all $DCI_{PDSCH/PUSCH}$ are successfully decoded by the UE), the base station may indicate for the UE to stop monitoring PDCCH monitoring by sending a signal via a DCI, for example. The signal may be referred to as a PDCCH monitoring skipping signal and may include one or more bits, fields, etc., of a DCI configured to convey the indication for the UE to stop monitoring any remaining PDCCH monitoring occasions within the plurality of PDCCH monitoring slots 305. Accordingly, the UE may monitor the control channel (e.g., the control portions 310) for a third grant (e.g., the retransmission of the first grant 320-b and/or the retransmission of the one or more second grants 325-b) during each slot 305 of the plurality of slots 305 occurring after the slot 305 in which the first grant 320-a is received. The UE may receive the third grant during at least one slot 305 of the plurality of slots 305 (e.g., in slot 305-b) and refrain from monitoring the control channel during slots 305 of the plurality of slots occurring after the slot 305 in which the third grant is received. That is, based on the NACK information for the one or more second grants 320-a provided in uplink portion 330, the UE may be configured to monitor the control portions 310 of each slot 305 until the third grant (the retransmission of the first grant 320-b and/or the retransmission of the one or more second grants 325-b) is received. Then, once the third grant is received, the UE may refrain from monitoring the control portions 310 of the remaining slots 305 in the plurality of slots 305. In the example illustrated in FIG. 3, this may include the UE refraining from monitoring the control portions 310-c through 310-h of slots 305-c through 305-h, respectively, based on the UE receiving the third grant in the control portion 310-b of slot 305-b.

In another example, this may include using a timer function of the UE, e.g., an inactivity timer. For example, the UE may initiate a timer based on receiving the first grant 320-a and continue to monitor the control channel during each subsequent slot 305 while the timer it is running. The UE may receive the third grant (e.g., the retransmission of the first grant 320-b and/or the retransmission of the one or more second grants 325-b) and reset the timer in response. Once the UE determines that the timer has expired, the UE may refrain from monitoring the control channel during subsequent slots 305. That is, the inactivity timer may start upon $DCI_{CORESET}$ reception. Until the inactivity timer expires, the UE may continue to monitor PDCCH (e.g., the control portion 310 of slots 305). If the PDCCH is detected (e.g., if the UE successfully decodes the third grant corresponding to the retransmission of the first grant 320-b and/or the retransmission of the one or more second grants 325-b), the inactivity timer may be reset to an initial or default value. When the inactivity timer expires, the UE may stop PDCCH monitoring.

Accordingly, slot configuration 300 illustrates an example where some of the HARQ feedback of $DCI_{PDSCH/PUSCH}$ are NACK, e.g., using one ACK/NACK bit assigned for each $DCI_{PDSCH/PUSCH}$. In this example, only PDSCH indicated by ACKed $DCI_{PDSCH}$ are actually assigned. The $DCI_{CORESET}$ including the NACKed $DCI_{PDSCH/PUSCH}$ is transmitted at the earliest possible CORESET to assign the PDSCH/PUSCH(s) again. This same process may be repeated until all $DCI_{PDSCH/PUSCH}$ are ACKed.

Figure 4:
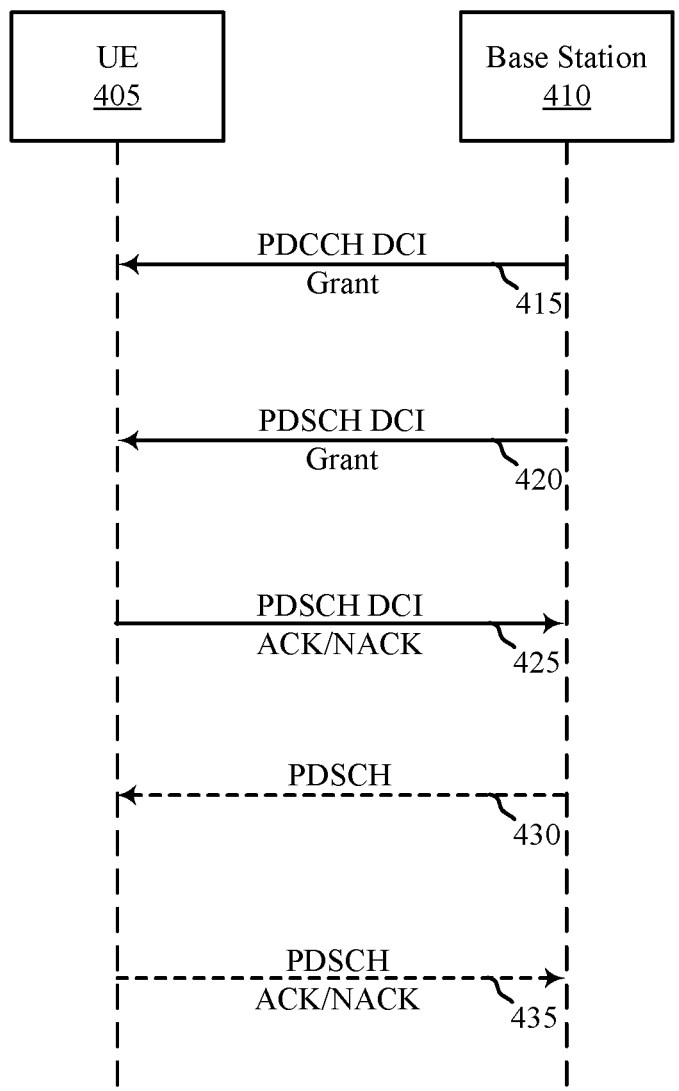
FIG. 4 illustrates an example of a process that supports robustness enhancement for downlink control information in a downlink data channel in accordance with aspects of the present disclosure.

FIG. 4 illustrates an example of a process 400 that supports robustness enhancement for downlink control information in a downlink data channel in accordance with aspects of the present disclosure. In some examples, process 400 may implement aspects of wireless communication system 100 and/or slot configurations 200 and/or 300. Aspects of process 400 may be implemented by UE 405 and/or base station 410, which may be examples of the corresponding devices described herein.

At 415, base station 410 may transmit (and UE 405 may receive) a first grant identifying a first set of resources of a first data channel on which the UE 405 is to monitor for one or more second grants. The first grant may be transmitted in a control channel (e.g., PDCCH). The first grant may be a downlink DCI grant (e.g., $DCI_{CORESET}$). The first data channel may be a PDSCH, e.g., a downlink data channel.

At 420, UE 405 may monitor the first set of resources in the first data channel for the one or more second grants transmitted from base station 410. The one or more second grants may identify a second set of resources of a second data channel on which the UE 405 is to perform data communications. In some aspects, the second set of resources may be provisionally granted resources based on UE 405 monitoring the first set of resources. That is, the second set of resources may be utilized for the data communications when UE 405 indicates ACK information for the one or more second grants in the feedback message. Alternatively, the second set of resources may be reallocated by base station 410 to another UE when UE 405 indicates NACK information for the one or more second grants in the feedback message (and/or when the feedback message is not received by the base station 410).

In some aspects, this may include UE 405 monitoring the control channel, based at least in part on an indication in the first grant and during a slot occurring after the slot that the first grant is received, for a third grant (e.g., a retransmission of the first grant and/or a retransmission of the one or more of the second grants). In some aspects, this may include UE 405 monitoring the control channel for the third grant during each slot of a plurality of slots occurring after the slot in which the first grant was received. UE 405 may receive the third grant during at least one slot in the plurality of slots and refrain from monitoring the control channel during slots occurring after the slot that the third grant is received. This may be based on an indication provided in the third grant, in some examples. In some aspects, this may include base station 410 transmitting (and UE 405 receiving) a configuration signal identifying the plurality of slots in which to monitor the control channel. In this example, the plurality of slots may include the slot that the first grant was received and one or more slots occurring after the slot that the first grant was received.

In some aspects, this may include UE 405 initiating a timer in response to receiving the first grant, where UE 405 monitors the control channel during each slot occurring after the slot in which the first grant was received while the timer it is running. When UE 405 receives the third grant in the control channel, UE 405 may reset the timer in response. If UE 405 determines that the timer has expired, UE 405 may refrain from monitoring the control channel based upon the timer expiration.

In some aspects, the first grant in the control channel may be received, the first set of resources in the first data channel may be monitored, and the feedback message may be transmitted, in one or more slots occurring before the second set of resources of the second data channel in which UE 405 is to perform the data communications.

At 425, UE 405 may transmit (and base station 410 may receive) a feedback message associated with receipt of the one or more second grants. For example, the feedback message may be transmitted based at least in part on the monitoring of the first set of resources by UE 405. In some aspects, the feedback message may be configured with a single indication of whether the one or more second grants were received or with an indication for each second grant in the one or more second grants of whether the corresponding second grants were received, e.g., using one bit or a set of bits, with each bit in the set of bits corresponding to a respective second grant.

In some aspects, the feedback message may be transmitted separately from, or concurrently with, a second feedback message associated with receipt of a data transmission configured by the first grant. The feedback message may be transmitted in an uplink control channel (e.g., PUCCH) and/or in an uplink data channel (e.g., PUSCH). For example, UE 405 may identify an uplink resource on the uplink data and/or control channel based at least in part on the first grant.

At 430, UE 405 may optionally monitor the second set of resources in the second data channel for a data transmission transmitted from base station 410. For example, UE 405 may monitor the second set of resources in one or more slots occurring after the slot in which the first grant is received in order to receive the data transmissions scheduled by the one or more second grants.

At 435, UE 405 may transmit (and base station 410 may receive) a second feedback message associated with receipt of the data transmission. The second feedback message may be transmitted based at least in part on UE 405 monitoring the second set of resources. In some aspects, each of the one or more second grants may also identify uplink resources used for transmitting the second feedback message.

Figure 5:
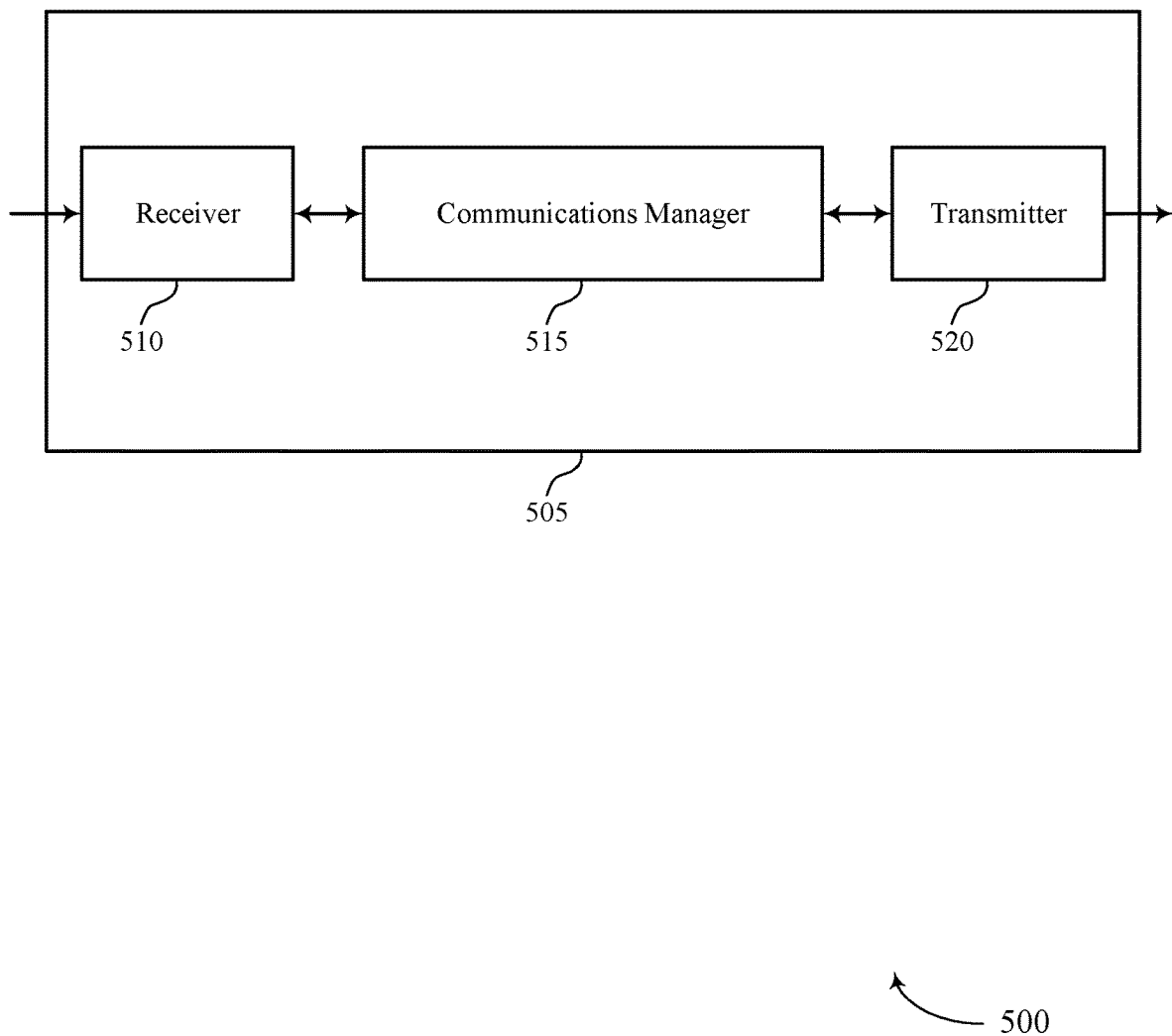
FIGS. 5 and 6 show block diagrams of devices that support robustness enhancement for downlink control information in a downlink data channel in accordance with aspects of the present disclosure.

FIG. 5 shows a block diagram 500 of a device 505 that supports robustness enhancement for downlink control information in a downlink data channel in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to robustness enhancement for downlink control information in a downlink data channel, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, in a control channel, a first grant identifying a first set of resources of a first data channel on which the UE is to monitor for one or more second grants, the first data channel being downlink, monitor the first set of resources in the first data channel for the one or more second grants, the one or more second grants identifying a second set of resources of a second data channel on which the UE is to perform data communications, and transmit, based on the monitoring the first set of resources, a feedback message associated with receipt of the one or more second grants. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
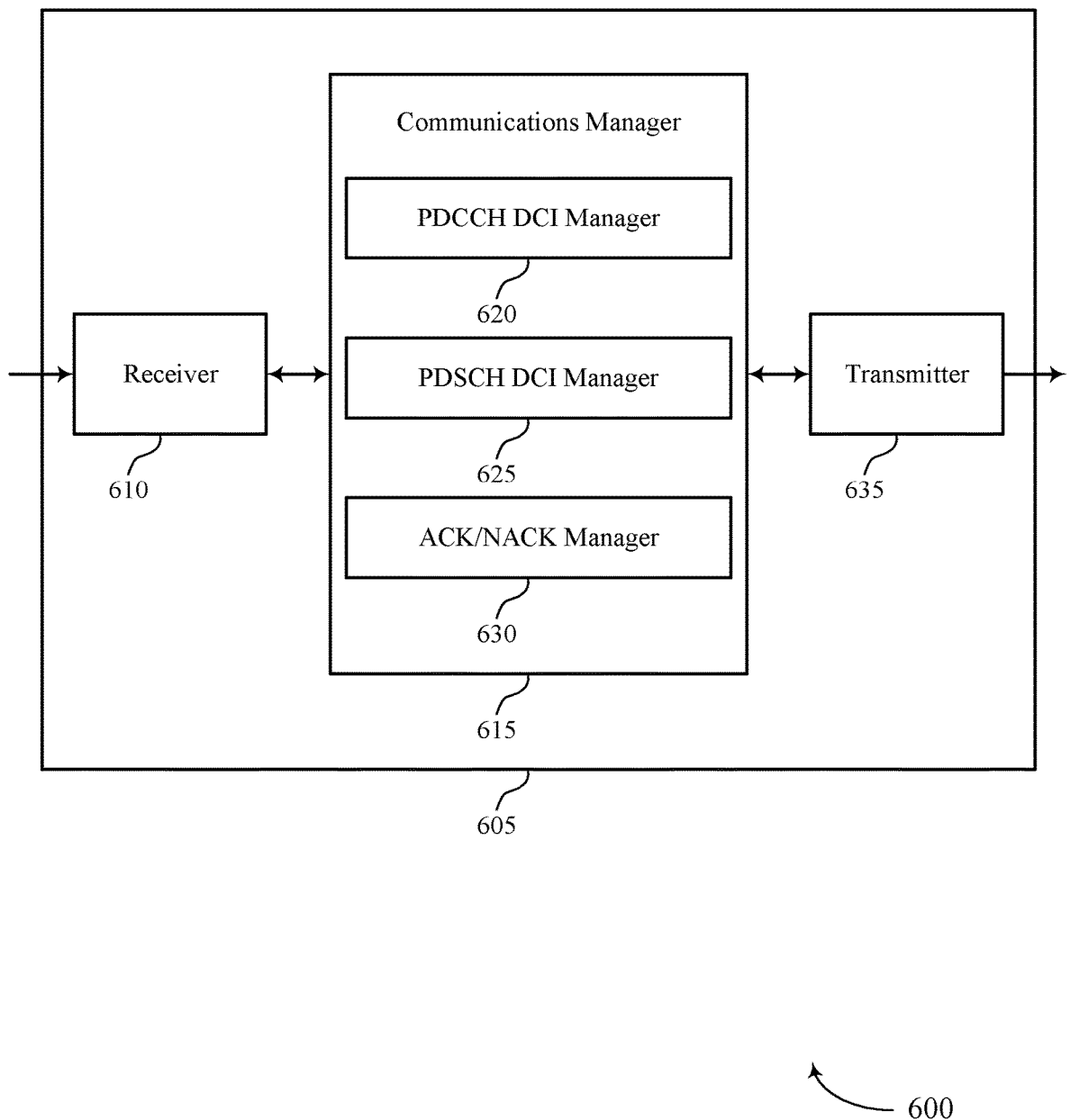

FIG. 6 shows a block diagram 600 of a device 605 that supports robustness enhancement for downlink control information in a downlink data channel in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to robustness enhancement for downlink control information in a downlink data channel, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a PDCCH DCI manager 620, a PDSCH DCI manager 625, and an ACK/NACK manager 630. The communications manager 615 may be an example of aspects of the communications manager 810 described herein.

The PDCCH DCI manager 620 may receive, in a control channel, a first grant identifying a first set of resources of a first data channel on which the UE is to monitor for one or more second grants, the first data channel being downlink.

The PDSCH DCI manager 625 may monitor the first set of resources in the first data channel for the one or more second grants, the one or more second grants identifying a second set of resources of a second data channel on which the UE is to perform data communications.

The ACK/NACK manager 630 may transmit, based on the monitoring the first set of resources, a feedback message associated with receipt of the one or more second grants.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
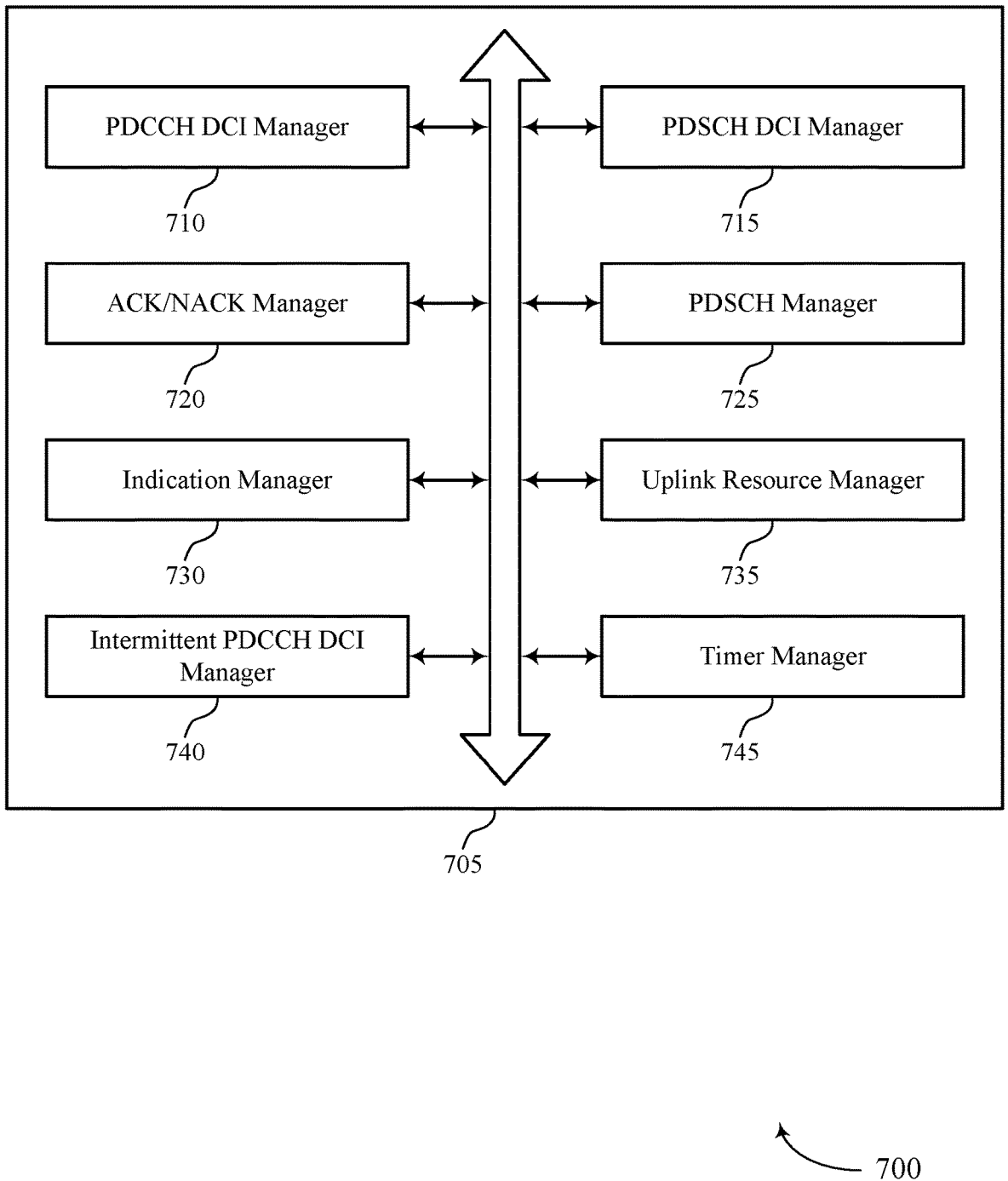
FIG. 7 shows a block diagram of a communications manager that supports robustness enhancement for downlink control information in a downlink data channel in accordance with aspects of the present disclosure.

FIG. 7 shows a block diagram 700 of a communications manager 705 that supports robustness enhancement for downlink control information in a downlink data channel in accordance with aspects of the present disclosure. The communications manager 705 may be an example of aspects of a communications manager 515, a communications manager 615, or a communications manager 810 described herein. The communications manager 705 may include a PDCCH DCI manager 710, a PDSCH DCI manager 715, an ACK/NACK manager 720, a PDSCH manager 725, an indication manager 730, an uplink resource manager 735, an intermittent PDCCH DCI manager 740, and a timer manager 745. Each of these modules may communicate, directly or indirectly, with one another (e.g., via one or more buses).

The PDCCH DCI manager 710 may receive, in a control channel, a first grant identifying a first set of resources of a first data channel on which the UE is to monitor for one or more second grants, the first data channel being downlink. In some cases, the first grant in the control channel is received, the first set of resources in the first data channel are monitored, and the feedback message is transmitted in one or more slots occurring before the second set of resources of the second data channel on which the UE is to perform the data communications.

The PDSCH DCI manager 715 may monitor the first set of resources in the first data channel for the one or more second grants, the one or more second grants identifying a second set of resources of a second data channel on which the UE is to perform data communications. In some cases, the second set of resources include provisionally-granted resources based on the monitoring the first set of resources.

The ACK/NACK manager 720 may transmit, based on the monitoring the first set of resources, a feedback message associated with receipt of the one or more second grants.

The PDSCH manager 725 may monitor the second set of resources in the second data channel for a data transmission. In some examples, the PDSCH manager 725 may transmit, based on the monitoring the second set of resources, a second feedback message associated with receipt of the data transmission.

The indication manager 730 may configure the feedback message with a single indication of whether the one or more second grants were received. In some examples, the indication manager 730 may configure, for each second grant in the one or more second grants, the feedback message with an indication of whether the corresponding second grant was received. In some examples, the indication manager 730 may transmit the feedback message separately from a second feedback message associated with receipt of a data transmission configured by the first grant. In some examples, the indication manager 730 may transmit the feedback message concurrently with a second feedback message associated with receipt of a data transmission configured by the first grant.

The uplink resource manager 735 may transmit the feedback message in at least one of an uplink control channel, or an uplink data channel, or a combination thereof. In some examples, the uplink resource manager 735 may identify, for the feedback message, an uplink resource on the uplink data channel based on the first grant.

The intermittent PDCCH DCI manager 740 may monitor the control channel, based on an indication in the first grant and during a slot occurring after a slot that the first grant is received in, for a third grant. In some examples, the intermittent PDCCH DCI manager 740 may monitor the control channel, during each slot of a set of slots occurring after a slot in which the first grant is received, for a third grant. In some examples, the intermittent PDCCH DCI manager 740 may receive the third grant during at least one slot of the set of slots. In some examples, the intermittent PDCCH DCI manager 740 may refrain, based on an indication in the third grant, from monitoring the control channel during slots of the set of slots occurring after the at least one slot in which the third grant was received.

In some examples, the intermittent PDCCH DCI manager 740 may receive a configuration signal identifying a set of slots in which to monitor the control channel, the set of slots including a slot in which the first grant was received and one or more slots occurring after the slot in which the first grant was received. In some examples, the intermittent PDCCH DCI manager 740 may monitor the control channel according to the configuration signal.

The timer manager 745 may initiate a timer based on receiving the first grant. In some examples, the timer manager 745 may monitor, while the timer is running, the control channel during each slot occurring after a slot in which the first grant is received. In some examples, the timer manager 745 may receive, based at least on monitoring the control channel, a third grant in the control channel. In some examples, the timer manager 745 may reset the timer based on receiving the third grant. In some examples, the timer manager 745 may determine that the timer has expired. In some examples, the timer manager 745 may refrain from monitoring the control channel based on expiry of the timer.

Figure 8:
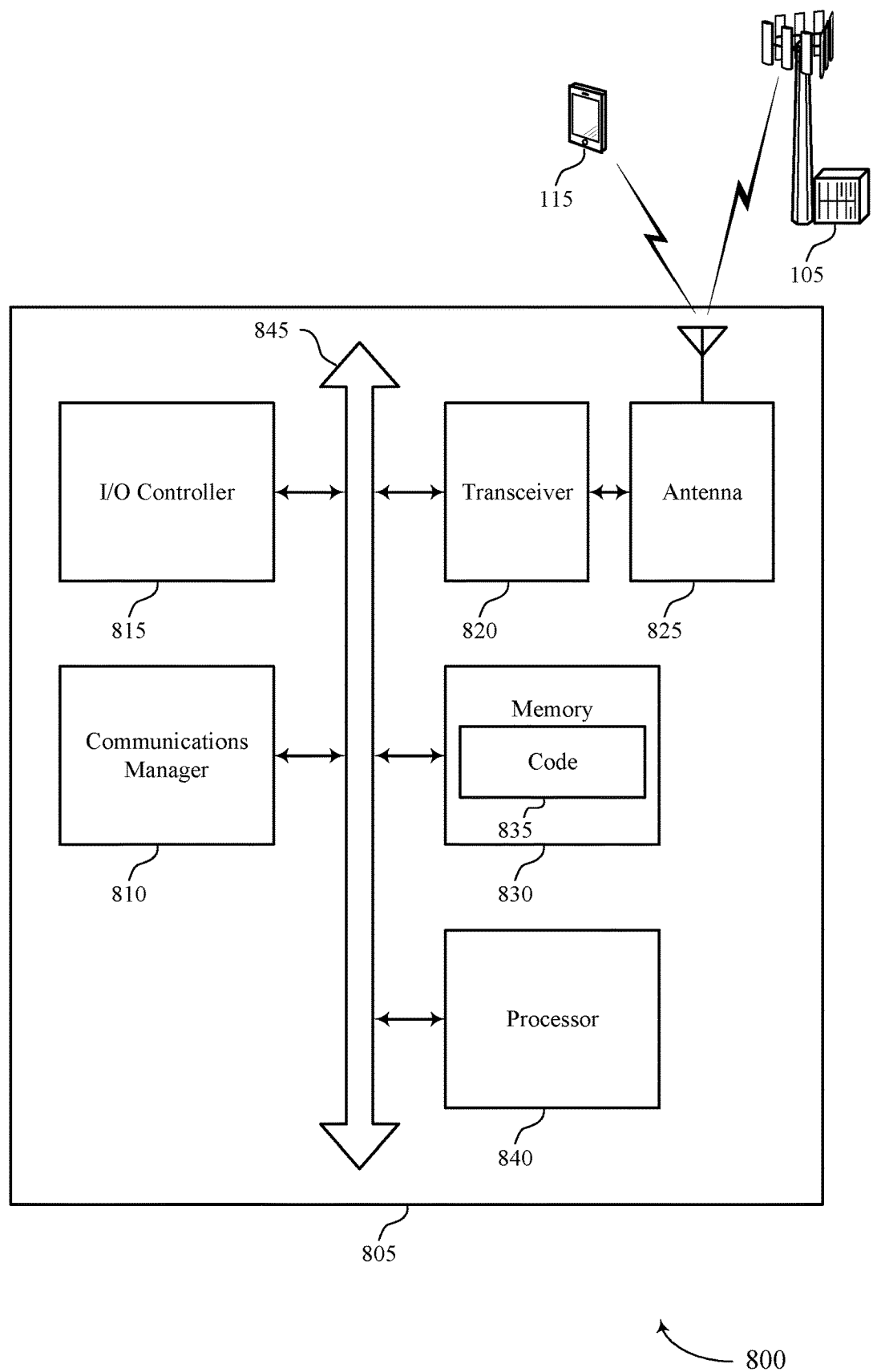
FIG. 8 shows a diagram of a system including a device that supports robustness enhancement for downlink control information in a downlink data channel in accordance with aspects of the present disclosure.

FIG. 8 shows a diagram of a system 800 including a device 805 that supports robustness enhancement for downlink control information in a downlink data channel in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, in a control channel, a first grant identifying a first set of resources of a first data channel on which the UE is to monitor for one or more second grants, the first data channel being downlink, monitor the first set of resources in the first data channel for the one or more second grants, the one or more second grants identifying a second set of resources of a second data channel on which the UE is to perform data communications, and transmit, based on the monitoring the first set of resources, a feedback message associated with receipt of the one or more second grants.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting robustness enhancement for downlink control information in a downlink data channel).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
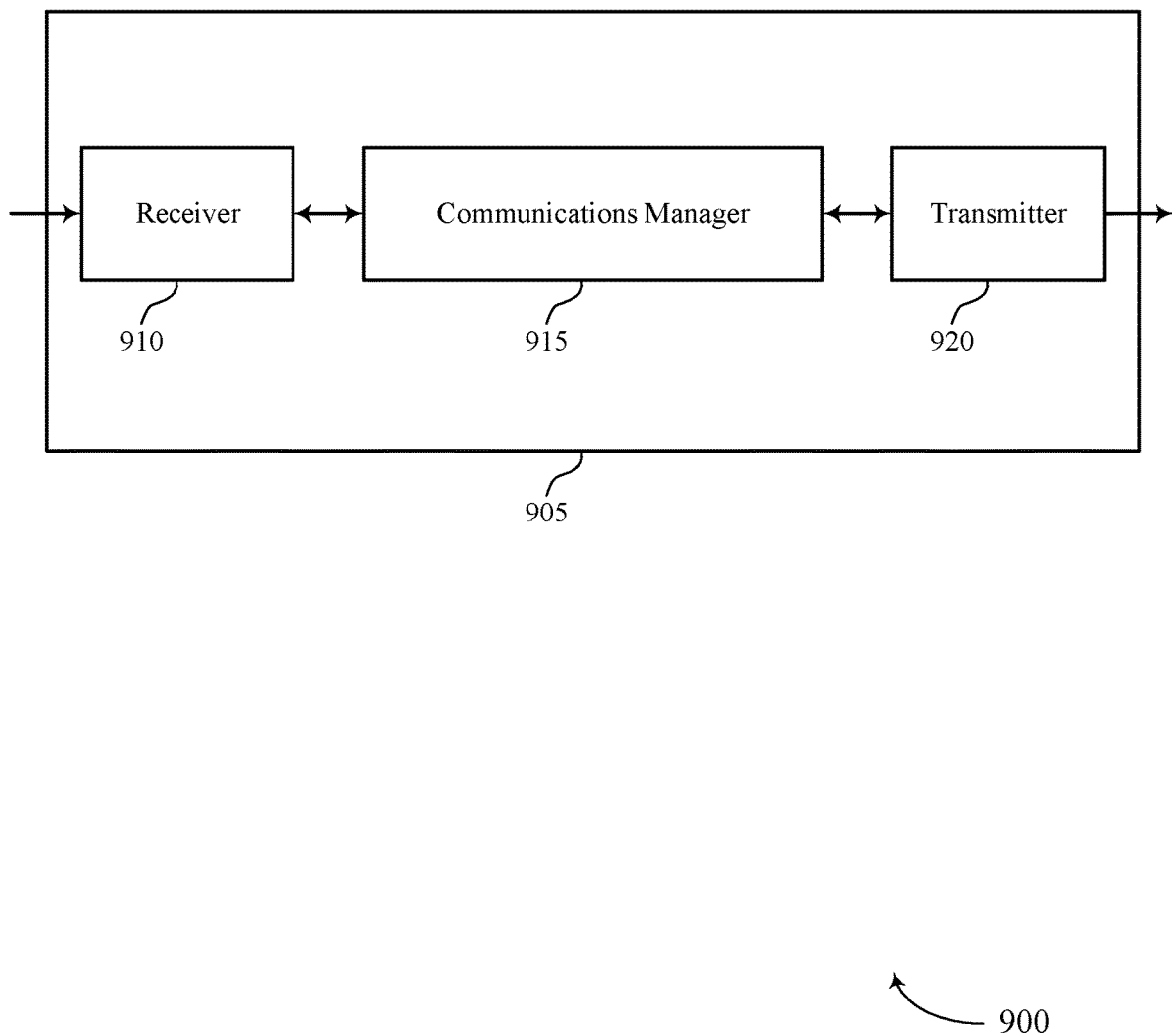
FIGS. 9 and 10 show block diagrams of devices that support robustness enhancement for downlink control information in a downlink data channel in accordance with aspects of the present disclosure.

FIG. 9 shows a block diagram 900 of a device 905 that supports robustness enhancement for downlink control information in a downlink data channel in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to robustness enhancement for downlink control information in a downlink data channel, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, in a control channel, a first grant identifying a first set of resources of a first data channel on which a UE is to monitor for one or more second grants, the first data channel being downlink, transmit the one or more second grants in the second data channel using the first set of resources, the one or more second grants identifying a second set of resources of a second data channel on which the UE is to perform data communications, and receive, based on the UE monitoring the first set of resources, a feedback message associated with receipt of the one or more second grants. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
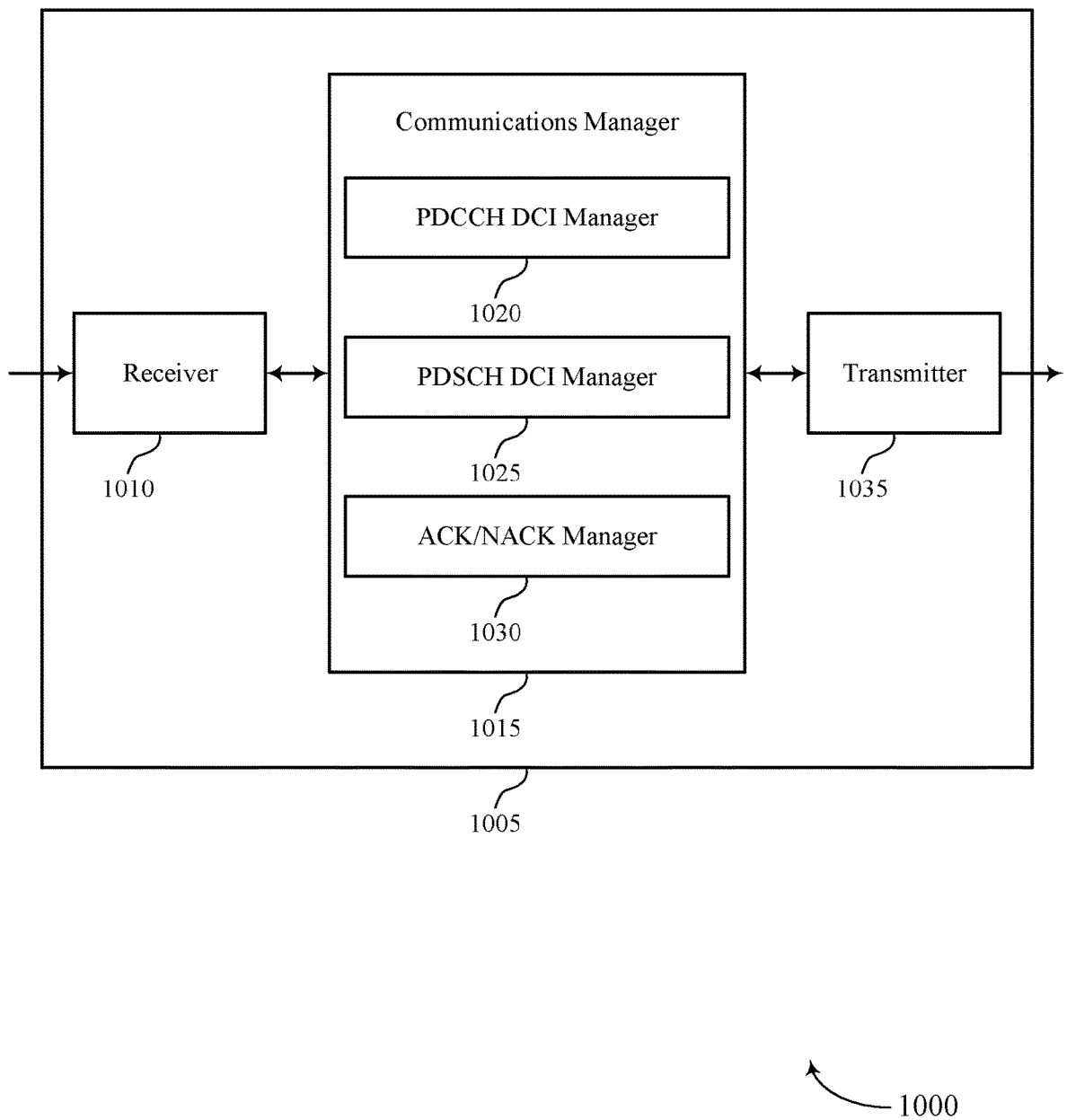

FIG. 10 shows a block diagram 1000 of a device 1005 that supports robustness enhancement for downlink control information in a downlink data channel in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to robustness enhancement for downlink control information in a downlink data channel, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a PDCCH DCI manager 1020, a PDSCH DCI manager 1025, and an ACK/NACK manager 1030. The communications manager 1015 may be an example of aspects of the communications manager 1210 described herein.

The PDCCH DCI manager 1020 may transmit, in a control channel, a first grant identifying a first set of resources of a first data channel on which a UE is to monitor for one or more second grants, the first data channel being downlink.

The PDSCH DCI manager 1025 may transmit the one or more second grants in the first data channel using the first set of resources, the one or more second grants identifying a second set of resources of a second data channel on which the UE is to perform data communications.

The ACK/NACK manager 1030 may receive, based on the UE monitoring the first set of resources, a feedback message associated with receipt of the one or more second grants.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
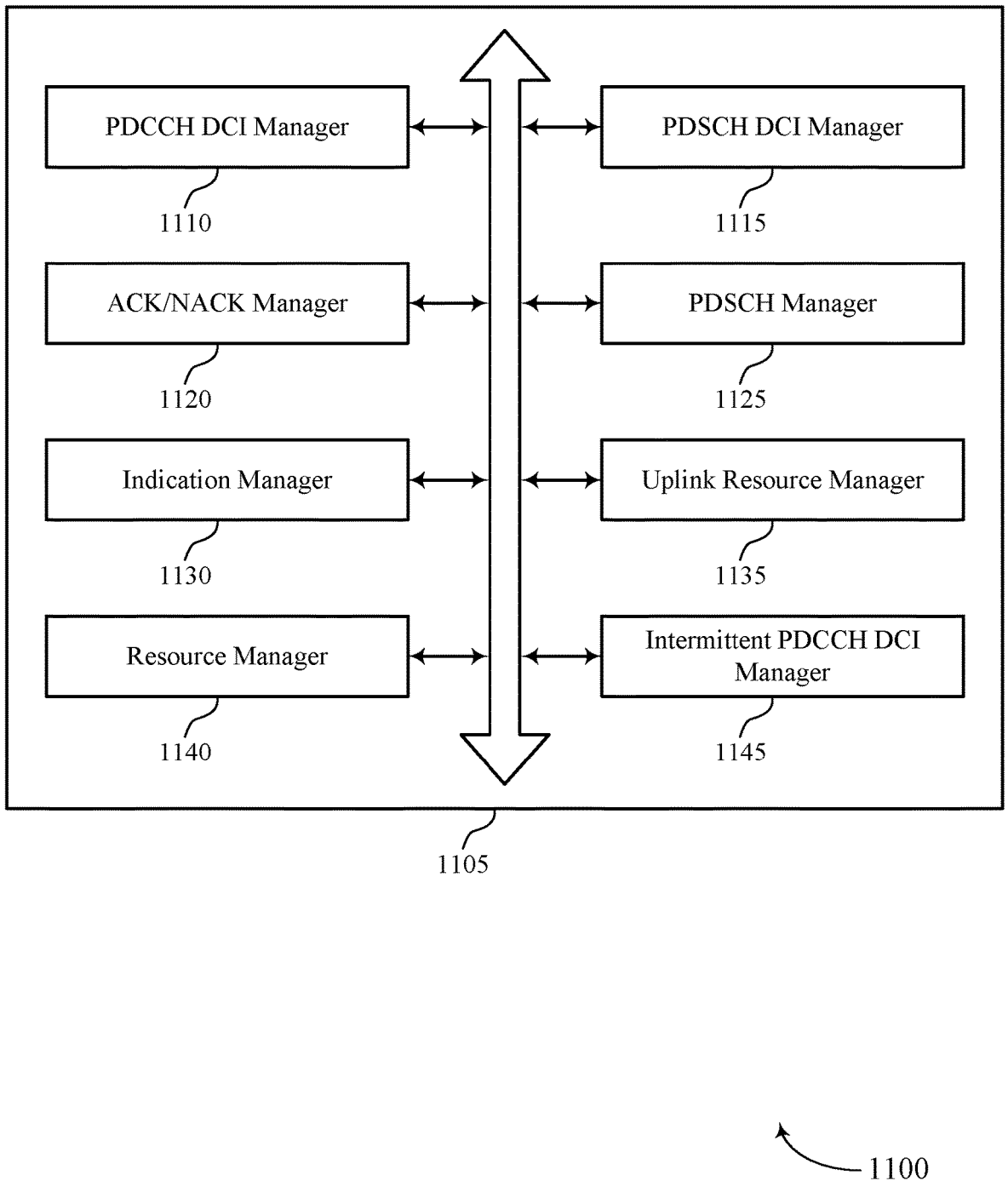
FIG. 11 shows a block diagram of a communications manager that supports robustness enhancement for downlink control information in a downlink data channel in accordance with aspects of the present disclosure.

FIG. 11 shows a block diagram 1100 of a communications manager 1105 that supports robustness enhancement for downlink control information in a downlink data channel in accordance with aspects of the present disclosure. The communications manager 1105 may be an example of aspects of a communications manager 915, a communications manager 1015, or a communications manager 1210 described herein. The communications manager 1105 may include a PDCCH DCI manager 1110, a PDSCH DCI manager 1115, an ACK/NACK manager 1120, a PDSCH manager 1125, an indication manager 1130, an uplink resource manager 1135, a resource manager 1140, and an intermittent PDCCH DCI manager 1145. Each of these modules may communicate, directly or indirectly, with one another (e.g., via one or more buses).

The PDCCH DCI manager 1110 may transmit, in a control channel, a first grant identifying a first set of resources of a first data channel on which a UE is to monitor for one or more second grants, the first data channel being downlink. In some cases, the first grant in the control channel is transmitted, the first set of resources in the first data channel occur, and the feedback message is received in one or more slots occurring before the second set of resources of the second data channel on which the UE is to perform the data communications.

The PDSCH DCI manager 1115 may transmit the one or more second grants in the first data channel using the first set of resources, the one or more second grants identifying a second set of resources of the second data channel on which the UE is to perform data communications.

The ACK/NACK manager 1120 may receive, based on the UE monitoring the first set of resources, a feedback message associated with receipt of the one or more second grants.

The PDSCH manager 1125 may transmit a data transmission in the second set of resources in the second data channel. In some examples, the PDSCH manager 1125 may receive, based on the UE monitoring the second set of resources, a second feedback message associated with receipt of the data transmission. In some examples, the PDSCH manager 1125 may determine, based on the feedback message, that the UE received the one or more second grants. In some examples, the PDSCH manager 1125 may perform the data communications in the second set of resources.

The indication manager 1130 may determine that the feedback message includes a single indication of whether the one or more second grants were received. In some examples, the indication manager 1130 may determine, for each second grant in the one or more second grants, that the feedback message includes an indication of whether the corresponding second grant was received. In some examples, the indication manager 1130 may receive the feedback message separately from a second feedback message associated with receipt of a data transmission configured by the first grant. In some examples, the indication manager 1130 may receive the feedback message concurrently with a second feedback message associated with receipt of a data transmission configured by the first grant.

The uplink resource manager 1135 may receive the feedback message in at least one of an uplink control channel, or an uplink data channel, or a combination thereof. In some examples, the uplink resource manager 1135 may configure the first grant to identify an uplink resource on the uplink data channel for the feedback message.

The resource manager 1140 may determine that the UE did not receive the one or more second grants. In some examples, the resource manager 1140 may reallocate the second set of resources based on the determining.

The intermittent PDCCH DCI manager 1145 may configure the first grant to indicate for the UE to monitor the control channel for a third grant during a slot occurring after a slot that the first grant is transmitted in. In some examples, the intermittent PDCCH DCI manager 1145 may transmit a third grant in the control channel during a slot of a set of slots occurring after a slot in which the first grant is transmitted, the third grant indicating for the UE to refrain from monitoring the control channel during slots of the set of slots occurring after the slot in which the third grant was transmitted.

In some examples, the intermittent PDCCH DCI manager 1145 may transmit a configuration signal identifying a set of slots in which the UE is to monitor the control channel, the set of slots including a slot in which the first grant was transmitted and one or more slots occurring after the slot in which the first grant was transmitted.

Figure 12:
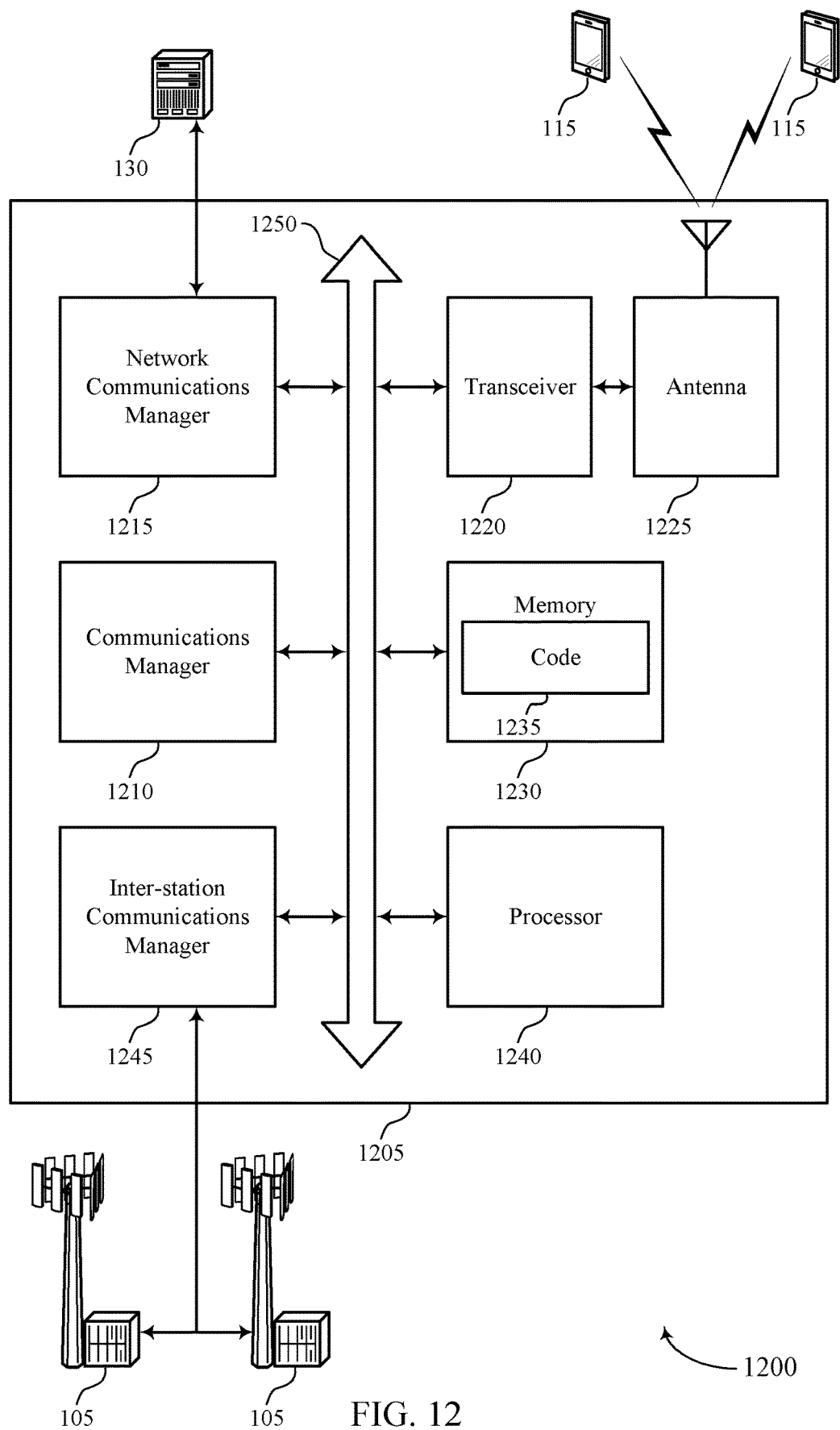
FIG. 12 shows a diagram of a system including a device that supports robustness enhancement for downlink control information in a downlink data channel in accordance with aspects of the present disclosure.

FIG. 12 shows a diagram of a system 1200 including a device 1205 that supports robustness enhancement for downlink control information in a downlink data channel in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit, in a control channel, a first grant identifying a first set of resources of a first data channel on which a UE is to monitor for one or more second grants, the first data channel being downlink, transmit the one or more second grants in the first data channel using the first set of resources, the one or more second grants identifying a second set of resources of a second data channel on which the UE is to perform data communications, and receive, based on the UE monitoring the first set of resources, a feedback message associated with receipt of the one or more second grants.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting robustness enhancement for downlink control information in a downlink data channel).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
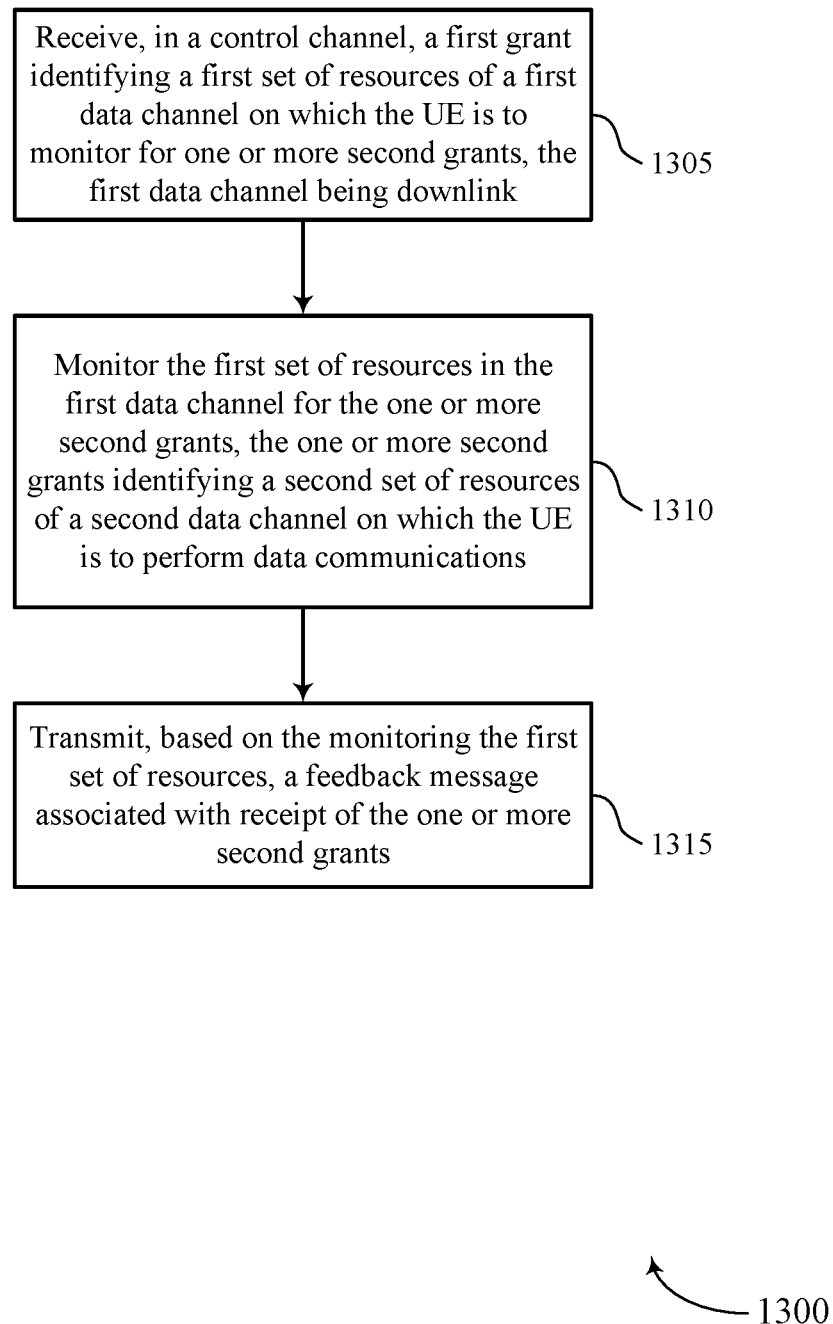
FIGS. 13 through 17 show flowcharts illustrating methods that support robustness enhancement for downlink control information in a downlink data channel in accordance with aspects of the present disclosure.

FIG. 13 shows a flowchart illustrating a method 1300 that supports robustness enhancement for downlink control information in a downlink data channel in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive, in a control channel, a first grant identifying a first set of resources of a first data channel on which the UE is to monitor for one or more second grants, the first data channel being downlink. The operations of 1305 may be performed according to the methods described herein. In some examples, aspects of the operations of 1305 may be performed by a PDCCH DCI manager as described with reference to FIGS. 5 through 8.

At 1310, the UE may monitor the first set of resources in the first data channel for the one or more second grants, the one or more second grants identifying a second set of resources of a second data channel on which the UE is to perform data communications. The operations of 1310 may be performed according to the methods described herein. In some examples, aspects of the operations of 1310 may be performed by a PDSCH DCI manager as described with reference to FIGS. 5 through 8.

At 1315, the UE may transmit, based on the monitoring the first set of resources, a feedback message associated with receipt of the one or more second grants. The operations of 1315 may be performed according to the methods described herein. In some examples, aspects of the operations of 1315 may be performed by an ACK/NACK manager as described with reference to FIGS. 5 through 8.

Figure 14:
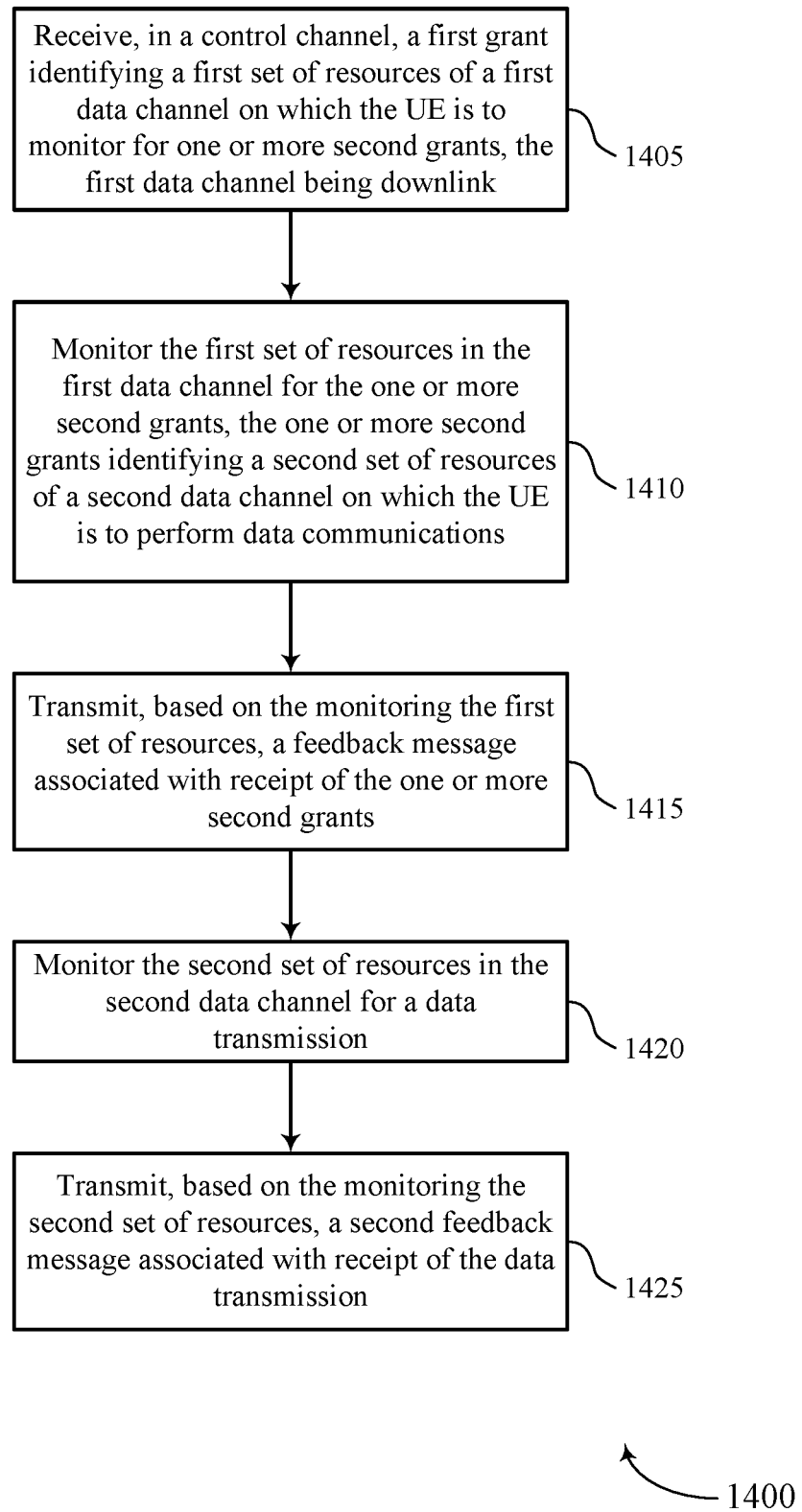

FIG. 14 shows a flowchart illustrating a method 1400 that supports robustness enhancement for downlink control information in a downlink data channel in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive, in a control channel, a first grant identifying a first set of resources of a first data channel on which the UE is to monitor for one or more second grants, the first data channel being downlink. The operations of 1405 may be performed according to the methods described herein. In some examples, aspects of the operations of 1405 may be performed by a PDCCH DCI manager as described with reference to FIGS. 5 through 8.

At 1410, the UE may monitor the first set of resources in the first data channel for the one or more second grants, the one or more second grants identifying a second set of resources of a second data channel on which the UE is to perform data communications. The operations of 1410 may be performed according to the methods described herein. In some examples, aspects of the operations of 1410 may be performed by a PDSCH DCI manager as described with reference to FIGS. 5 through 8.

At 1415, the UE may transmit, based on the monitoring the first set of resources, a feedback message associated with receipt of the one or more second grants. The operations of 1415 may be performed according to the methods described herein. In some examples, aspects of the operations of 1415 may be performed by an ACK/NACK manager as described with reference to FIGS. 5 through 8.

At 1420, the UE may monitor the second set of resources in the second data channel for a data transmission. The operations of 1420 may be performed according to the methods described herein. In some examples, aspects of the operations of 1420 may be performed by a PDSCH manager as described with reference to FIGS. 5 through 8.

At 1425, the UE may transmit, based on the monitoring the second set of resources, a second feedback message associated with receipt of the data transmission. The operations of 1425 may be performed according to the methods described herein. In some examples, aspects of the operations of 1425 may be performed by a PDSCH manager as described with reference to FIGS. 5 through 8.

Figure 15:
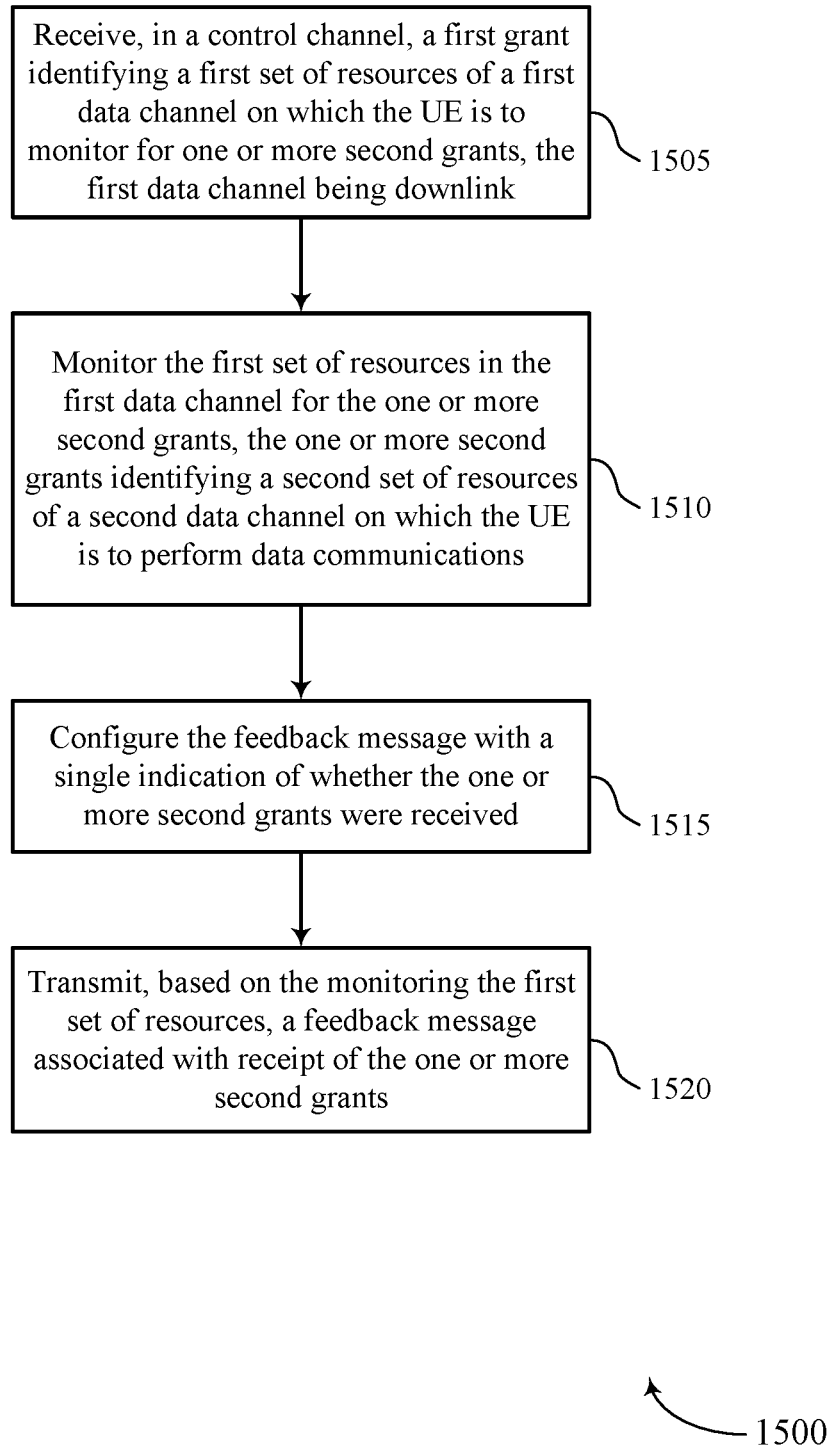

FIG. 15 shows a flowchart illustrating a method 1500 that supports robustness enhancement for downlink control information in a downlink data channel in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive, in a control channel, a first grant identifying a first set of resources of a first data channel on which the UE is to monitor for one or more second grants, the first data channel being downlink. The operations of 1505 may be performed according to the methods described herein. In some examples, aspects of the operations of 1505 may be performed by a PDCCH DCI manager as described with reference to FIGS. 5 through 8.

At 1510, the UE may monitor the first set of resources in the first data channel for the one or more second grants, the one or more second grants identifying a second set of resources of a second data channel on which the UE is to perform data communications. The operations of 1510 may be performed according to the methods described herein. In some examples, aspects of the operations of 1510 may be performed by a PDSCH DCI manager as described with reference to FIGS. 5 through 8.

At 1515, the UE may configure the feedback message with a single indication of whether the one or more second grants were received. The operations of 1515 may be performed according to the methods described herein. In some examples, aspects of the operations of 1515 may be performed by an indication manager as described with reference to FIGS. 5 through 8.

At 1520, the UE may transmit, based on the monitoring the first set of resources, a feedback message associated with receipt of the one or more second grants. The operations of 1520 may be performed according to the methods described herein. In some examples, aspects of the operations of 1520 may be performed by an ACK/NACK manager as described with reference to FIGS. 5 through 8.

Figure 16:
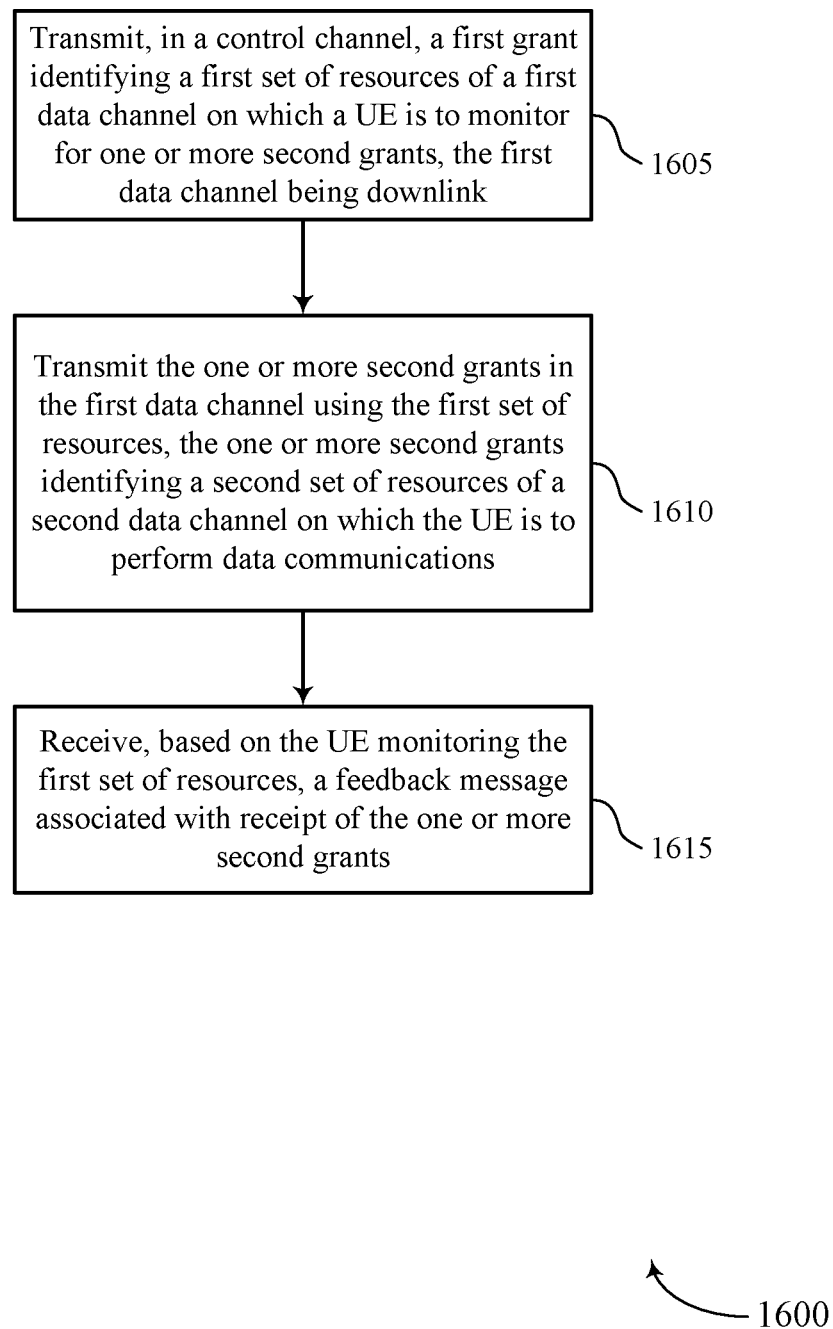

FIG. 16 shows a flowchart illustrating a method 1600 that supports robustness enhancement for downlink control information in a downlink data channel in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may transmit, in a control channel, a first grant identifying a first set of resources of a first data channel on which a UE is to monitor for one or more second grants, the first data channel being downlink. The operations of 1605 may be performed according to the methods described herein. In some examples, aspects of the operations of 1605 may be performed by a PDCCH DCI manager as described with reference to FIGS. 9 through 12.

At 1610, the base station may transmit the one or more second grants in the first data channel using the first set of resources, the one or more second grants identifying a second set of resources of a second data channel on which the UE is to perform data communications. The operations of 1610 may be performed according to the methods described herein. In some examples, aspects of the operations of 1610 may be performed by a PDSCH DCI manager as described with reference to FIGS. 9 through 12.

At 1615, the base station may receive, based on the UE monitoring the first set of resources, a feedback message associated with receipt of the one or more second grants. The operations of 1615 may be performed according to the methods described herein. In some examples, aspects of the operations of 1615 may be performed by an ACK/NACK manager as described with reference to FIGS. 9 through 12.

Figure 17:
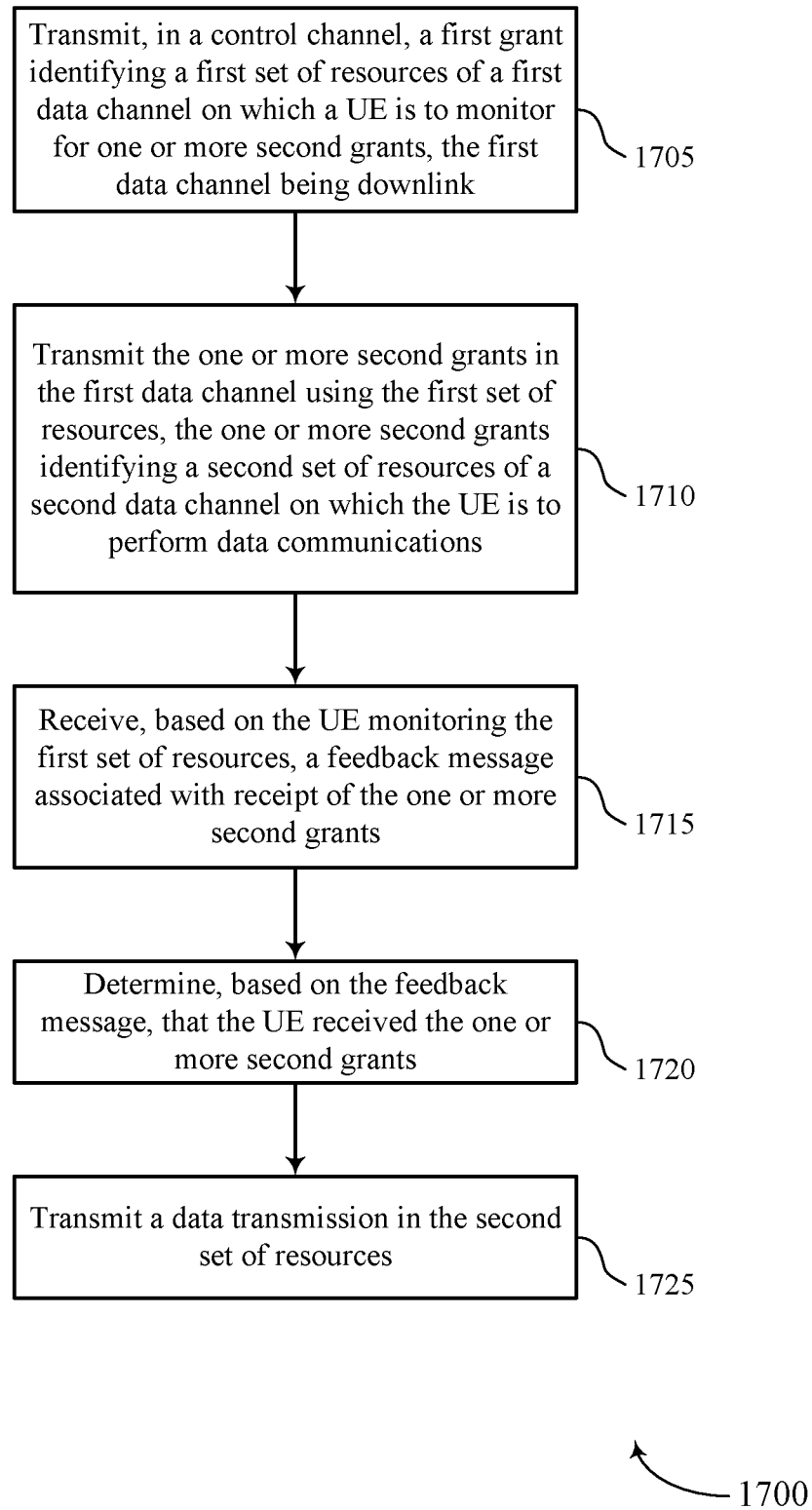

FIG. 17 shows a flowchart illustrating a method 1700 that supports robustness enhancement for downlink control information in a downlink data channel in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may transmit, in a control channel, a first grant identifying a first set of resources of a first data channel on which a UE is to monitor for one or more second grants, the first data channel being downlink. The operations of 1705 may be performed according to the methods described herein. In some examples, aspects of the operations of 1705 may be performed by a PDCCH DCI manager as described with reference to FIGS. 9 through 12.

At 1710, the base station may transmit the one or more second grants in the first data channel using the first set of resources, the one or more second grants identifying a second set of resources of a second data channel on which the UE is to perform data communications. The operations of 1710 may be performed according to the methods described herein. In some examples, aspects of the operations of 1710 may be performed by a PDSCH DCI manager as described with reference to FIGS. 9 through 12.

At 1715, the base station may receive, based on the UE monitoring the first set of resources, a feedback message associated with receipt of the one or more second grants. The operations of 1715 may be performed according to the methods described herein. In some examples, aspects of the operations of 1715 may be performed by an ACK/NACK manager as described with reference to FIGS. 9 through 12.

At 1720, the base station may determine, based on the feedback message, that the UE received the one or more second grants. The operations of 1720 may be performed according to the methods described herein. In some examples, aspects of the operations of 1720 may be performed by a PDSCH manager as described with reference to FIGS. 9 through 12.

At 1725, the base station may transmit a data transmission in the second set of resources. The operations of 1725 may be performed according to the methods described herein. In some examples, aspects of the operations of 1725 may be performed by a PDSCH manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies.

While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, in a control channel, a first grant identifying a first set of resources of a first downlink data channel on which the UE is to monitor for one or more second grants;
   monitoring the first set of resources in the first downlink data channel for the one or more second grants, the one or more second grants identifying a second set of resources of a second downlink data channel on which the UE is to perform data communications; and
   transmitting, based at least in part on the monitoring the first set of resources, a feedback message associated with receipt of the one or more second grants.

2. The method of claim 1, further comprising:
   transmitting the feedback message separately from a second feedback message associated with receipt of a data transmission in the first downlink data channel configured by the first grant.

3. The method of claim 1, further comprising:
   monitoring the second set of resources in the second downlink data channel for a data transmission; and
   transmitting, based at least in part on the monitoring the second set of resources, a second feedback message associated with receipt of the data transmission.

4. The method of claim 1, further comprising:
   configuring the feedback message with a single indication of whether the one or more second grants were received.

5. The method of claim 1, further comprising:
   configuring, for each second grant in the one or more second grants, the feedback message with an indication of whether a corresponding second grant was received.

6. The method of claim 1, further comprising:
   transmitting the feedback message concurrently with a second feedback message associated with receipt of a data transmission configured by the first grant.

7. The method of claim 1, further comprising:
   transmitting the feedback message in at least one of an uplink control channel, or an uplink data channel, or a combination thereof.

8. The method of claim 7, further comprising:
   identifying, for the feedback message, an uplink resource on the uplink data channel based at least in part on the first grant.

9. The method of claim 1, wherein the second set of resources comprise provisionally-granted resources based at least in part on the monitoring the first set of resources.

10. The method of claim 1, further comprising:
    monitoring the control channel, based at least in part on an indication in the first grant and during a slot occurring after a slot that the first grant is received in, for a third grant.

11. The method of claim 1, further comprising:
monitoring the control channel, during each slot of a plurality of slots occurring after a slot in which the first grant is received, for a third grant;
receiving the third grant during at least one slot of the plurality of slots; and
refraining, based at least in part on an indication in the third grant, from monitoring the control channel during slots of the plurality of slots occurring after the at least one slot in which the third grant was received.

12. The method of claim 1, further comprising:
receiving a configuration signal identifying a plurality of slots in which to monitor the control channel, the plurality of slots including a slot in which the first grant was received and one or more slots occurring after the slot in which the first grant was received; and
monitoring the control channel according to the configuration signal.

13. The method of claim 1, further comprising:
initiating a timer based at least in part on receiving the first grant; and
monitoring, while the timer is running, the control channel during each slot occurring after a slot in which the first grant is received.

14. The method of claim 13, further comprising:
receiving, based at least on monitoring the control channel, a third grant in the control channel; and
resetting the timer based at least in part on receiving the third grant.

15. The method of claim 13, further comprising:
determining that the timer has expired; and
refraining from monitoring the control channel based at least in part on expiry of the timer.

16. The method of claim 1, wherein the first grant in the control channel is received, the first set of resources in the first downlink data channel are monitored, and the feedback message is transmitted in one or more slots occurring before the second set of resources of the second downlink data channel on which the UE is to perform the data communications.

17. A method for wireless communication at a base station, comprising:
transmitting, in a control channel, a first grant identifying a first set of resources of a first downlink data channel on which a user equipment (UE) is to monitor for one or more second grants;
transmitting the one or more second grants in the first downlink data channel using the first set of resources, the one or more second grants identifying a second set of resources of a second downlink data channel on which the UE is to perform data communications; and
receiving, based at least in part on the UE monitoring the first set of resources, a feedback message associated with receipt of the one or more second grants.

18. The method of claim 17, further comprising:
receiving the feedback message separately from a second feedback message associated with receipt of a data transmission in the first downlink data channel configured by the first grant.

19. The method of claim 17, further comprising:
transmitting a data transmission in the second set of resources in the second downlink data channel; and
receiving, based at least in part on the UE monitoring the second set of resources, a second feedback message associated with receipt of the data transmission.

20. The method of claim 17, further comprising:
determining that the feedback message comprises a single indication of whether the one or more second grants were received.

21. The method of claim 17, further comprising:
determining, for each second grant in the one or more second grants, that the feedback message comprises an indication of whether a corresponding second grant was received.

22. The method of claim 17, further comprising:
receiving the feedback message concurrently with a second feedback message associated with receipt of a data transmission configured by the first grant.

23. The method of claim 17, further comprising:
receiving the feedback message in at least one of an uplink control channel, or an uplink data channel, or a combination thereof.

24. An apparatus for wireless communication at a user equipment (UE), comprising:
a processor;
memory coupled with the processor; and
instructions stored in the memory and executable by the processor to cause the apparatus to:
receive, in a control channel, a first grant identifying a first set of resources of a first downlink data channel on which the UE is to monitor for one or more second grants;
monitor the first set of resources in the first downlink data channel for the one or more second grants, the one or more second grants identifying a second set of resources of a second downlink data channel on which the UE is to perform data communications; and
transmit, based at least in part on the monitoring the first set of resources, a feedback message associated with receipt of the one or more second grants.

25. The apparatus of claim 24, wherein the instructions are further executable by the processor to cause the apparatus to:
transmit the feedback message separately from a second feedback message associated with receipt of a data transmission in the first downlink data channel configured by the first grant.

26. The apparatus of claim 24, wherein the instructions are further executable by the processor to cause the apparatus to:
monitor the second set of resources in the second downlink data channel for a data transmission; and
transmit, based at least in part on the monitoring the second set of resources, a second feedback message associated with receipt of the data transmission.

27. The apparatus of claim 24, wherein the instructions are further executable by the processor to cause the apparatus to:
configure the feedback message with a single indication of whether the one or more second grants were received.

28. The apparatus of claim 24, wherein the instructions are further executable by the processor to cause the apparatus to:
configure, for each second grant in the one or more second grants, the feedback message with an indication of whether a corresponding second grant was received.

29. The apparatus of claim 24, wherein the instructions are further executable by the processor to cause the apparatus to:
> transmit the feedback message concurrently with a second feedback message associated with receipt of a data transmission configured by the first grant.

30. An apparatus for wireless communication at a base station, comprising:
> a processor,
> memory coupled with the processor; and
> instructions stored in the memory and executable by the processor to cause the apparatus to:
>> transmit, in a control channel, a first grant identifying a first set of resources of a first downlink data channel on which a user equipment (UE) is to monitor for one or more second grants;
>> transmit the one or more second grants in the first downlink data channel using the first set of resources, the one or more second grants identifying a second set of resources of a second downlink data channel on which the UE is to perform data communications; and
>> receive, based at least in part on the UE monitoring the first set of resources, a feedback message associated with receipt of the one or more second grants.

* * * * *